(12) United States Patent
Park et al.

(10) Patent No.: US 11,057,640 B2
(45) Date of Patent: Jul. 6, 2021

(54) IMAGE DECODING METHOD AND APPARATUS BASED ON INTER-PREDICTION IN IMAGE CODING SYSTEM

(71) Applicant: LG ELECTRONICS INC., Seoul (KR)

(72) Inventors: Naeri Park, Seoul (KR); Seethal Paluri, Seoul (KR); Junghak Nam, Seoul (KR); Jungdong Seo, Seoul (KR); Jaeho Lee, Seoul (KR); Hyeongmoon Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/767,925

(22) PCT Filed: Nov. 28, 2018

(86) PCT No.: PCT/KR2018/014822
§ 371 (c)(1),
(2) Date: May 28, 2020

(87) PCT Pub. No.: WO2019/107916
PCT Pub. Date: Jun. 6, 2019

(65) Prior Publication Data
US 2020/0296414 A1 Sep. 17, 2020

Related U.S. Application Data

(60) Provisional application No. 62/593,161, filed on Nov. 30, 2017.

(30) Foreign Application Priority Data

Mar. 30, 2018 (KR) .................. 10-2018-0037579

(51) Int. Cl.
*H04N 19/56* (2014.01)
*H04N 19/105* (2014.01)
(Continued)

(52) U.S. Cl.
CPC .......... *H04N 19/56* (2014.11); *H04N 19/105* (2014.11); *H04N 19/176* (2014.11); *H04N 19/186* (2014.11)

(58) Field of Classification Search
CPC ....... H04N 19/105; H04N 19/52; H04N 19/56
See application file for complete search history.

(56) References Cited

U.S. PATENT DOCUMENTS

2013/0208799 A1* 8/2013 Srinivasamurthy .. H04N 19/119
375/240.16
2016/0366415 A1 12/2016 Liu et al.
(Continued)

FOREIGN PATENT DOCUMENTS

| KR | 20170075784 A | 7/2017 |
|----|---------------|--------|
| KR | 20170102844 A | 9/2017 |
| WO | 2017157281 A1 | 9/2017 |

*Primary Examiner* — Mainul Hasan
(74) *Attorney, Agent, or Firm* — Dentons US LLP

(57) ABSTRACT

A video decoding method performed by a decoding apparatus includes obtaining information regarding inter-prediction of a current block via a bitstream; forming an MVP candidate list based on neighbouring blocks of the current block; deriving costs with respect to MVP candidates that are included in the MVP candidate list; deriving a revised MVP candidate list based on the costs with respect to the MVP candidates; deriving MVP of the current block based on the revised MVP candidate list; deriving a motion vector of the current block based on the MVP and MVD of the current block; and performing prediction on the current block based on a reference picture index and the motion
(Continued)

vector of the current block. The information regarding inter-prediction includes the reference picture index and the MVD.

12 Claims, 16 Drawing Sheets

(51) Int. Cl.
*H04N 19/176* (2014.01)
*H04N 19/186* (2014.01)

(56) References Cited

U.S. PATENT DOCUMENTS

| | | | |
|---|---|---|---|
| 2017/0111654 A1 | 4/2017 | Park et al. | |
| 2018/0098086 A1* | 4/2018 | Chuang | H04N 19/176 |
| 2018/0359483 A1* | 12/2018 | Chen | H04N 19/44 |
| 2019/0342557 A1* | 11/2019 | Robert | H04N 19/176 |
| 2020/0053361 A1* | 2/2020 | Robert | H04N 19/52 |
| 2020/0068218 A1* | 2/2020 | Chen | H04N 19/105 |
| 2020/0128258 A1* | 4/2020 | Chen | H04N 19/533 |
| 2020/0267408 A1* | 8/2020 | Lee | H04N 19/105 |

\* cited by examiner

IMAGE DECODING METHOD AND APPARATUS BASED ON INTER-PREDICTION IN IMAGE CODING SYSTEM

CROSS-REFERENCE TO RELATED APPLICATIONS

This application is the National Stage filing under 35 U.S.C. 371 of International Application No. PCT/KR2018/014822, filed on Nov. 28, 2018, which claims the benefit of U.S. Provisional Application No. 62/593,161 filed on Nov. 30, 2017 and Korean Patent Application No. 10-2018-0037579 filed on Mar. 30, 2018, the contents of which are all hereby incorporated by reference herein in their entirety.

BACKGROUND OF THE DISCLOSURE

Field of the Disclosure

The present disclosure relates to video coding technology, and more particularly, to a method and an apparatus for decoding a video according to an inter prediction in a video coding system.

Related Art

Demand for high-resolution, high-quality images such High Definition (HD) images and Ultra High Definition (UHD) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY OF THE DISCLOSURE

The present disclosure provides a method and an apparatus for increasing video coding efficiency.

The present disclosure also provides a method and an apparatus for decoding a video, which derive an MVP candidate list including various MVP candidates based on a motion vector of a neighboring block of a current block and perform prediction for the current block based on the derived MVP candidate list.

The present disclosure also provides a method and an apparatus for decoding a video, which derive cost for the MVP candidate and perform the prediction for the current block based on a modified MVP candidate list derived by reordering the MVP candidate list based on the cost.

The present disclosure also provides a method and an apparatus for decoding a video, which derive cost for the MVP candidate by considering a luma component and a chroma component of the current block and perform the prediction for the current block based on the modified MVP candidate list derived by reordering the MVP candidate list based on the cost.

The present disclosure also provides a method and an apparatus for decoding a video, which perform the prediction for the current block based on an MVP candidate list to which a refine MVP candidate derived by performing a refinement process for the MVP candidate is added.

In an aspect, a video decoding method performed by a decoding apparatus is provided. The method includes: obtaining information for inter prediction of a current block from bitstream; constructing a motion vector predictor (MVP) candidate list based on a neighboring block of the current block; deriving costs for MVP candidates included in the MVP candidate list; deriving a modified MVP candidate list based on the costs for the MVP candidates; deriving a MVP of the current block based on the modified MVP candidate list; deriving a motion vector of the current block based on the MVP of the current block and a motion vector difference (MVD); and performing prediction of the current block based on the motion vector and an reference picture index of the current block, in which the information for the inter prediction includes the MVD and the reference picture index.

In another aspect, a decoding apparatus performing video decoding is provided. The decoding apparatus includes: an entropy decoder obtaining information for inter prediction of a current block through bitstream; and a predictor constructing a motion vector predictor (MVP) candidate list based on a neighboring block of the current block, deriving costs for MVP candidates included in the MVP candidate list, deriving a modified MVP candidate list based on the costs for the MVP costs, deriving a MVP of the current block based on the modified MVP candidate list, deriving a motion vector of the current block based on the MVP of the current block and a motion vector difference (MVD), and performing prediction of the current block based on the motion vector and an reference picture index of the current block, in which the information for the inter prediction includes the MVD and the reference picture index.

In yet another aspect, a video encoding method performed by an encoding apparatus is provided. The method includes: constructing a motion vector predictor (MVP) candidate list based on a neighboring block of the current block; deriving costs for MVP candidates included in the MVP candidate list; deriving a modified MVP candidate list based on the costs for the MVP candidates; deriving a MVP of the current block based on the modified MVP candidate list; deriving a motion vector of the current block based on the MVP of the current block and a motion vector difference (MVD); performing prediction of the current block based on the motion vector and an reference picture index of the current block; and encoding information for inter prediction of the current block, in which the information for the inter prediction includes a reference picture index indicating a reference picture of the current block and a motion vector difference (MVD).

In still yet another aspect, a video encoding apparatus is provided. The encoding apparatus includes: a predictor constructing a motion vector predictor (MVP) candidate list based on a neighboring block of a current block, deriving costs for MVP candidates included in the MVP candidate list, deriving a modified MVP candidate list based on the costs for the MVP costs, deriving a MVP of the current block based on the modified MVP candidate list, deriving a motion vector of the current block based on the MVP of the current block, and performing prediction of the current block based on the motion vector of the current block; and an entropy encoder encoding information for inter prediction of the current block, in which the information for the inter prediction includes a reference picture index indicating a reference picture of the current block and a motion vector difference (MVD).

According to the present disclosure, an MVP candidate list including various MVP candidates can be derived based on neighboring blocks and through the derived MVP candidate list, prediction accuracy can be enhanced, a bit amount for transmission of an MVD can be reduced, and overall coding efficiency can be enhanced.

According to the present disclosure, an optimum MVP candidate for a current block can be reordered in an order indicated by an MVP index having a small value by considering cost and through the reordered optimum MVP candidate, a bit amount for a prediction can be reduced and overall coding efficiency can be enhanced.

According to the present disclosure, cost considering a luma component and a chroma component of the current block can be derived and the optimum MVP candidate list for the current block can be constructed based on the cost, and as a result, prediction accuracy and efficiency of the luma component and the chroma component can be enhanced and the overall coding efficiency can be enhanced.

According to the present disclosure, a refine MVP candidate which is the optimum MVP candidate can be derived based on the MVP candidate of the current block, and as a result, the prediction accuracy and efficiency can be enhanced and the overall coding efficiency can be enhanced.

DESCRIPTION OF EXEMPLARY EMBODIMENTS

Figure 1:
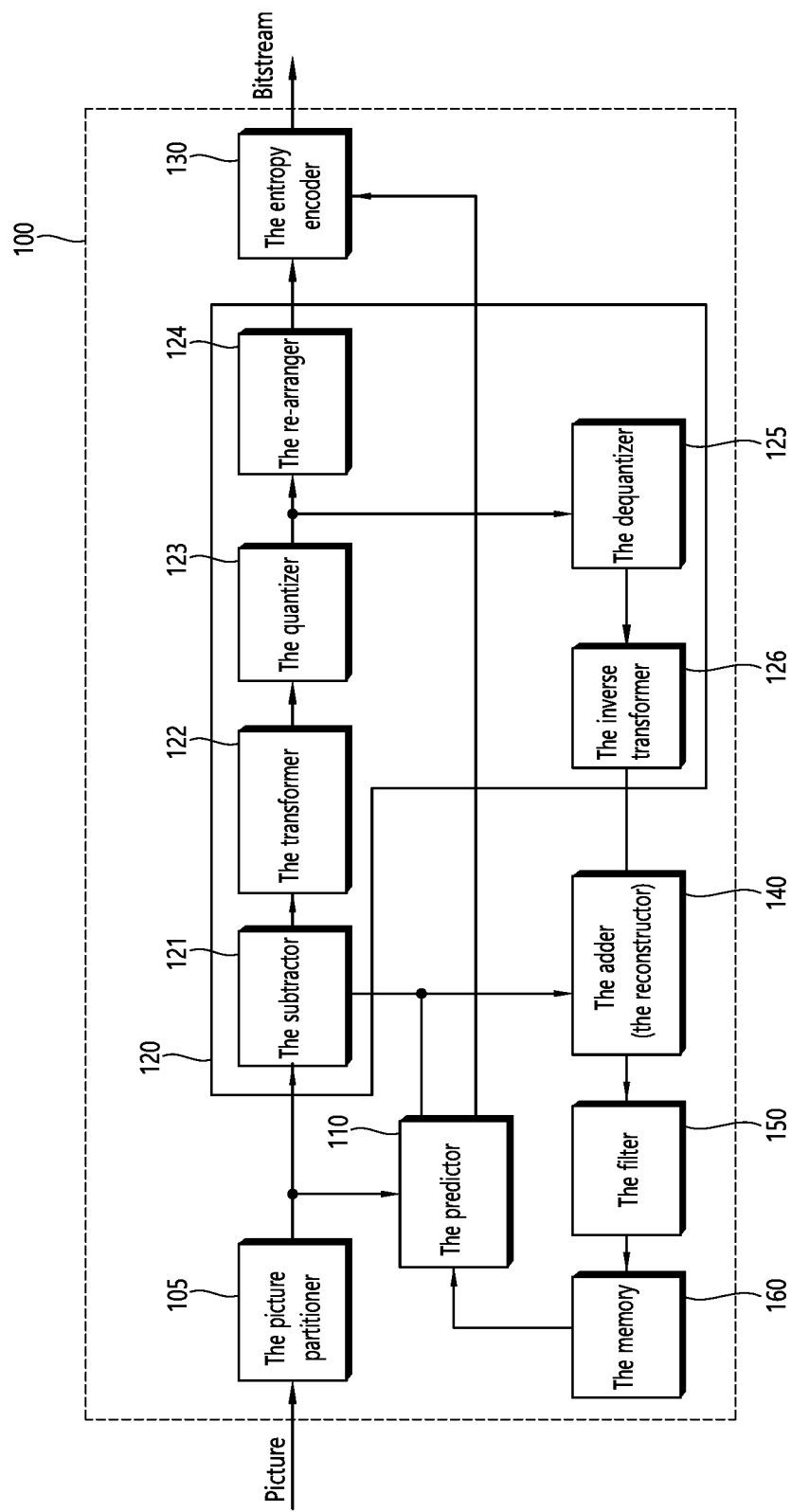
FIG. 1 is a schematic diagram illustrating a configuration of a video encoding apparatus to which the present disclosure is applicable.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 is a schematic diagram illustrating a configuration of a video encoding apparatus to which the present disclosure is applicable.

Referring to FIG. 1, a video encoding apparatus (100) may include a picture partitioner (105), a predictor (110), a residual processor (120), an entropy encoder (130), an adder (140), a filter (150), and a memory (160). The residual processor (120) may include a subtractor (121), a transformer (122), a quantizer (123), a re-arranger (124), a dequantizer (125), an inverse transformer (126).

The picture partitioner (105) may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quadtree structure and/or a binary tree structure. In this case, for example, the quad tree structure may be first applied and the binary tree structure may be applied later. Alternatively, the binary tree structure may be applied first. The coding procedure according to the present disclosure may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transformation, and reconstruction, which will be described later.

In another example, the processing unit may include a coding unit (CU) prediction unit (PU), or a transform unit (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units smaller than the smallest coding unit. Here, the final coding unit refers to a coding unit which is partitioned or split to a prediction unit or a transform unit. The prediction unit is a unit which is partitioned from a coding unit, and may be a unit of sample prediction. Here, the prediction unit may be divided into sub-blocks. The transform unit may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transform unit may be referred to as a transform block (TB). The prediction block or prediction unit may refer to a specific area in the form of a block in a picture and include an array of prediction samples. Also, the transform block or transform unit may refer to a specific area in the form of a block in a picture and include the transform coefficient or an array of residual samples.

The predictor (110) may perform prediction on a processing target block (hereinafter, a current block), and may generate a predicted block including prediction samples for the current block. A unit of prediction performed in the predictor (110) may be a coding block, or may be a transform block, or may be a prediction block.

The predictor (110) may determine whether intra-prediction is applied or inter-prediction is applied to the current block. For example, the predictor (110) may determine whether the intra-prediction or the inter-prediction is applied in unit of CU.

In case of the intra-prediction, the predictor (110) may derive a prediction sample for the current block based on a reference sample outside the current block in a picture to which the current block belongs (hereinafter, a current picture). In this case, the predictor (110) may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor (110) may determine the prediction mode to be applied to the current block by using the prediction mode applied to the neighboring block.

In case of the inter-prediction, the predictor (110) may derive the prediction sample for the current block based on a sample specified by a motion vector on a reference picture. The predictor (110) may derive the prediction sample for the current block by applying any one of a skip mode, a merge mode, and a motion vector prediction (MVP) mode. In case of the skip mode and the merge mode, the predictor (110) may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and can be discriminated from a coding order.

The subtractor (121) generates a residual sample which is a difference between an original sample and a prediction sample. If the skip mode is applied, the residual sample may not be generated as described above.

The transformer (122) transforms residual samples in units of a transform block to generate a transform coefficient. The transformer (122) may perform transformation based on the size of a corresponding transform block and a prediction mode applied to a coding block or prediction block spatially overlapping with the transform block. For example, residual samples can be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer (123) may quantize the transform coefficients to generate quantized transform coefficients.

The re-arranger (124) rearranges quantized transform coefficients. The re-arranger (124) may rearrange the quantized transform coefficients in the form of a block into a one-dimensional vector through a coefficient scanning method. Although the re-arranger (124) is described as a separate component, the re-arranger (124) may be a part of the quantizer (123).

The entropy encoder (130) may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder (130) may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer (125) dequantizes values (transform coefficients) quantized by the quantizer (123) and the inverse transformer (126) inversely transforms values dequantized by the dequantizer (125) to generate a residual sample.

The adder (140) adds a residual sample to a prediction sample to reconstruct a picture. The residual sample may be added to the prediction sample in units of a block to generate a reconstructed block. Although the adder (140) is described as a separate component, the adder (140) may be a part of the predictor (110). Meanwhile, the adder (140) may be referred to as a reconstructor or reconstructed block generator.

The filter (150) may apply deblocking filtering and/or a sample adaptive offset to the reconstructed picture. Artifacts at a block boundary in the reconstructed picture or distortion in quantization can be corrected through deblocking filtering and/or sample adaptive offset. Sample adaptive offset may be applied in units of a sample after deblocking filtering is completed. The filter (150) may apply an adaptive loop filter (ALF) to the reconstructed picture. The ALF may be applied to the reconstructed picture to which deblocking filtering and/or sample adaptive offset has been applied.

The memory (160) may store a reconstructed picture (decoded picture) or information necessary for encoding/decoding. Here, the reconstructed picture may be the reconstructed picture filtered by the filter (150). The stored reconstructed picture may be used as a reference picture for (inter) prediction of other pictures. For example, the memory (160) may store (reference) pictures used for inter-prediction. Here, pictures used for inter-prediction may be designated according to a reference picture set or a reference picture list.

Figure 2:
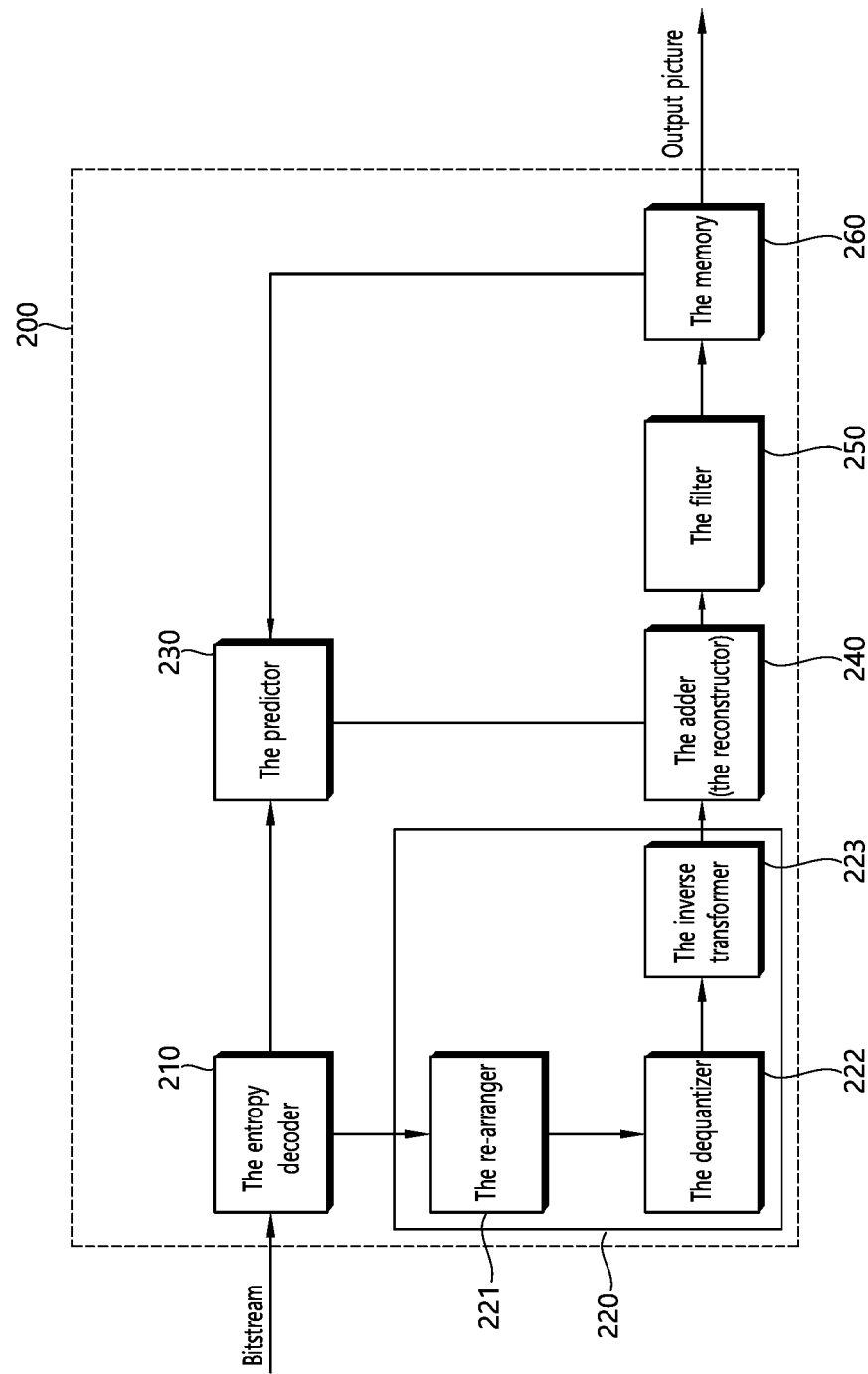
FIG. 2 is a schematic diagram illustrating a configuration of a video decoding apparatus to which the present disclosure is applicable.

FIG. 2 is a schematic diagram illustrating a configuration of a video decoding apparatus to which the present disclosure is applicable.

Referring to FIG. 2, a video decoding apparatus (200) may include an entropy decoder (210), a residual processor (220), a predictor (230), an adder (240), a filter (250), and a memory (260). The residual processor (220) may include a re-arranger (221), a dequantizer (222), and an inverse transformer (223).

When a bitstream including video information is input, the video decoding apparatus (200) may reconstruct a video in relation to a process by which video information is processed in the video encoding apparatus.

For example, the video decoding apparatus (200) may perform video decoding using a processing unit applied in the video encoding apparatus. Thus, the processing unit block of video decoding may be, for example, a coding unit and, in another example, a coding unit, a prediction unit or a transform unit. The coding unit may be split from the largest coding unit according to the quad tree structure and/or the binary tree structure.

A prediction unit and a transform unit may be further used in some cases, and in this case, the prediction block is a block derived or partitioned from the coding unit and may be a unit of sample prediction. Here, the prediction unit may be divided into sub-blocks. The transform unit may be split from the coding unit according to the quad tree structure and may be a unit that derives a transform coefficient or a unit that derives a residual signal from the transform coefficient.

The entropy decoder (210) may parse the bitstream to output information required for video reconstruction or picture reconstruction. For example, the entropy decoder (210) may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method can receive a bin corresponding to each syntax element in a bitstream, determine a context model using decoding target syntax element information and decoding information of neighboring and decoding target blocks or information of symbol/bin decoded in a previous step, predict bin generation probability according to the determined context model and perform arithmetic decoding of the bin to generate a symbol corresponding to each syntax element value. Here, the CABAC entropy decoding method can update the context model using information of a symbol/bin decoded for a context model of the next symbol/bin after determination of the context model.

Information on prediction among information decoded in the entropy decoder (210) may be provided to the predictor (230) and residual values, that is, quantized transform coefficients, on which entropy decoding has been performed by the entropy decoder (210) may be input to the re-arranger (221).

The re-arranger (221) may rearrange the quantized transform coefficients into a two-dimensional block form. The re-arranger (221) may perform rearrangement corresponding to coefficient scanning performed by the encoding apparatus. Although the re-arranger (221) is described as a separate component, the re-arranger (221) may be a part of the dequantizer (222).

The dequantizer (222) may de-quantize the quantized transform coefficients based on a (de)quantization parameter to output a transform coefficient. In this case, information for deriving a quantization parameter may be signaled from the encoding apparatus.

The inverse transformer (223) may inverse-transform the transform coefficients to derive residual samples.

The predictor (230) may perform prediction on a current block, and may generate a predicted block including prediction samples for the current block. A unit of prediction performed in the predictor (230) may be a coding block or may be a transform block or may be a prediction block.

The predictor (230) may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor (230) may derive a prediction sample for a current block based on a neighboring reference sample in a current picture. The predictor (230) may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor (230) may derive a prediction sample for a current block based on a sample specified in a reference picture according to a motion vector. The predictor (230) may derive the prediction sample for the current block using one of the skip mode, the merge mode and the MVP mode. Here, motion information required for inter-prediction of the current block provided by the video encoding apparatus, for example, a motion vector and information on a reference picture index may be obtained or derived based on the information on prediction.

In the skip mode and the merge mode, motion information of a neighboring block may be used as motion information of the current block. Here, the neighboring block may include a spatial neighboring block and a temporal neighboring block.

The predictor (230) may construct a merge candidate list using motion information of available neighboring blocks and use information indicated by a merge index on the merge candidate list as a motion vector of the current block. The merge index may be signaled by the encoding apparatus. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list can be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information on prediction may include a merge index indicating a candidate block having the best motion vector selected from candidate blocks included in the merge candidate list. Here, the predictor (230) may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information on prediction may include a prediction motion vector index indicating the best motion vector selected from motion vector candidates included in the list. Here, the predictor (230) may select a prediction motion vector of the current block from the motion vector candidates included in the motion vector candidate list using the motion vector index. The predictor of the encoding apparatus may obtain a motion vector difference (MVD) between the motion vector of the current block and a motion vector predictor, encode the MVD and output the encoded MVD in the form of a bitstream. That is, the MVD can be obtained by subtracting the motion vector predictor from the motion vector of the current block. Here, the predictor (230) may obtain a motion vector included in the information on prediction and derive the motion vector of the current block by adding the motion vector difference to the motion vector predictor. In addition, the predictor may obtain or derive a reference picture index indicating a reference picture from the aforementioned information on prediction.

The adder (240) can add a residual sample to a prediction sample to reconstruct a current block or a current picture. The adder (240) may reconstruct the current picture by adding the residual sample to the prediction sample in units of a block. When the skip mode is applied, a residual is not transmitted and thus the prediction sample may become a reconstructed sample. Although the adder (240) is described as a separate component, the adder (240) may be a part of the predictor (230). Meanwhile, the adder (240) may be referred to as a reconstructor or reconstructed block generator.

The filter (250) may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory (260) may store a reconstructed picture (decoded picture) or information necessary for decoding. Here, the reconstructed picture may be the reconstructed picture filtered by the filter (250). For example, the memory (260) may store pictures used for inter-prediction. Here, the pictures used for inter-prediction may be designated according to a reference picture set or a reference picture list. A reconstructed picture may be used as a reference picture for other pictures. The memory (260) may output reconstructed pictures in an output order.

The inter prediction for the current block may be performed by considering a motion of a target object or image between pictures as described above. As an example of the inter prediction, the encoding apparatus/decoding apparatus may derive the prediction sample for the current block by applying an advanced motion vector prediction (AMVP) mode. The AMVP mode may be referred to as a motion vector prediction (MVP) mode.

Meanwhile, here, motion information for the inter prediction may be bi-prediction motion information or uni-prediction motion information. Here, the bi-prediction motion information may include an L0 reference picture index and an L0 motion vector (L0 motion information), and an L1 reference picture index and an L1 motion vector (L1 motion information) and the uni-prediction motion information may include the L0 reference picture index and the L0 motion vector (L0 motion information) or include the L1 reference picture index and the L1 motion vector (L1 motion information). The L0 represents a reference picture list L0 (List 0) and the L1 represents a reference picture list L1 (List 1).

Meanwhile, prediction mode information indicating the inter prediction mode of the current block may be signaled from the encoding apparatus to the decoding apparatus. The prediction mode information may be included in a bitstream and received by the decoding apparatus. The prediction mode information may include index information indicating one of multiple candidate modes. Alternatively, the inter prediction mode may be indicated through a hierarchical signaling of flag information. In this case, the prediction mode information may include one or more flags. For example, whether to apply the skip mode may be indicated by signaling a skip flag, whether to apply the merge mode may be indicated by signaling a merge flag when the skip mode is not applied, and it is indicated that the MVP mode is applied or a flag for additional distinguishing may be further signaled when the merge mode is not applied.

When the AMVP mode is applied to the current block, a motion vector predictor (MVP) candidate list may be generated by using the motion vector of the reconstructed spatial neighboring block and/or the motion vector corresponding to the temporal neighboring block (or Col block). In other words, the motion vector of the reconstructed spatial neighboring block and/or the motion vector corresponding to the temporal neighboring block may be used as the motion vector predictor candidate. Meanwhile, information on the prediction of the current block may be signaled and the information on the prediction may include selection information (e.g., an MVP flag or MVP index) indicating an optimal motion vector predictor candidate selected among the motion vector predictor candidates included in the MVP candidate list. In this case, the predictor may select the motion vector predictor of the current block among the motion vector predictor candidates included in the motion vector candidate list by using the selected information. The predictor of the encoding apparatus may obtain a motion vector difference (MVD) between the motion vector and the motion vector predictor of the current block and encode the obtained MVD and output the encoded MVD in the form of the bitstream. In other words, the MVD may be obtained by a value obtained by subtracting the motion vector predictor from the motion vector of the current block. In this case, the predictor of the decoding apparatus may obtain the motion vector difference included in the information on the prediction and derive the motion vector of the current block by adding the motion vector difference and the motion vector predictor. The predictor of the decoding apparatus may obtain or derive the reference picture index indicating the reference picture from the information on the prediction.

Meanwhile, in order to reduce a bit amount used when applying the MVP mode and enhance coding efficiency, a method for reducing an MVD information amount by increasing accuracy of the MVP of the current block by using various neighboring blocks or a method for reducing an additional information amount by using only an MVP flag having a value of 0/1 other than an index because a transmitted information amount is relatively larger than the information amount in the merge mode may be proposed.

However, since the MVP candidates are listed according to a predetermined number and a predetermined order in the MVP candidate list, there is a case in which even though motion accuracy of a specific neighboring block for the current block is high, an MVP candidate derived based on a motion vector of the specific neighboring block is not selected as the MVP of the current block by considering a bit amount which is generated due to an MVP index or MVP flag. Therefore, the present disclosure proposes a method (ALR) that may effectively construct an MVP candidate by reordering the MVP candidate list in order to further increase the coding efficiency. Further, the present disclosure proposes various ALR improving methods for more effectively applying the ALR method.

Figure 3:
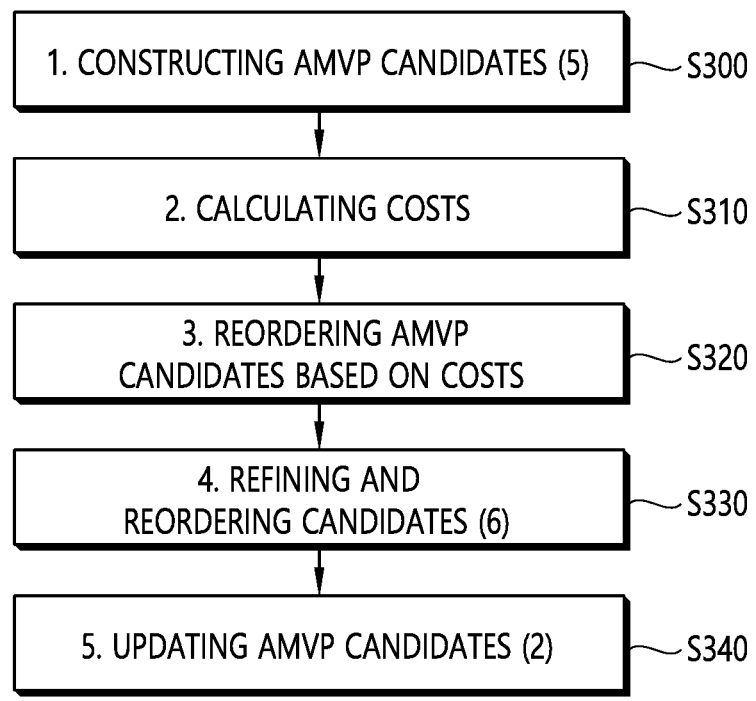
FIG. 3 illustrates an example of constructing an MVP candidate list through an ALR.

FIG. 3 illustrates an example of constructing the MVP candidate list through the ALR. Referring to FIG. 3, the encoding apparatus/decoding apparatus may construct MVP candidates based on the neighboring block of the current block, calculate cost of each of the MVP candidates and then reorder the MVP candidates based on the costs of the MVP candidates, and finally reconstruct an MVP candidate list by performing a refinement process based on the MVP candidates in the reordering order.

Specifically, the encoding apparatus/decoding apparatus may construct a maximum number of MVP candidates of the current block through the existing MVP candidate list constructing method (S300). In other words, the encoding apparatus/decoding apparatus may construct the MVP candidate list including the maximum number of MVP candidates through the existing MVP candidate list constructing method. For example, the maximum candidate number may be 5.

The encoding apparatus/decoding apparatus may calculate the cost for the MVP candidate of the MVP candidate list (S310). As an example, the cost may be calculated based on a template. In other words, the cost may be derived through a template matching method.

Figure 4:
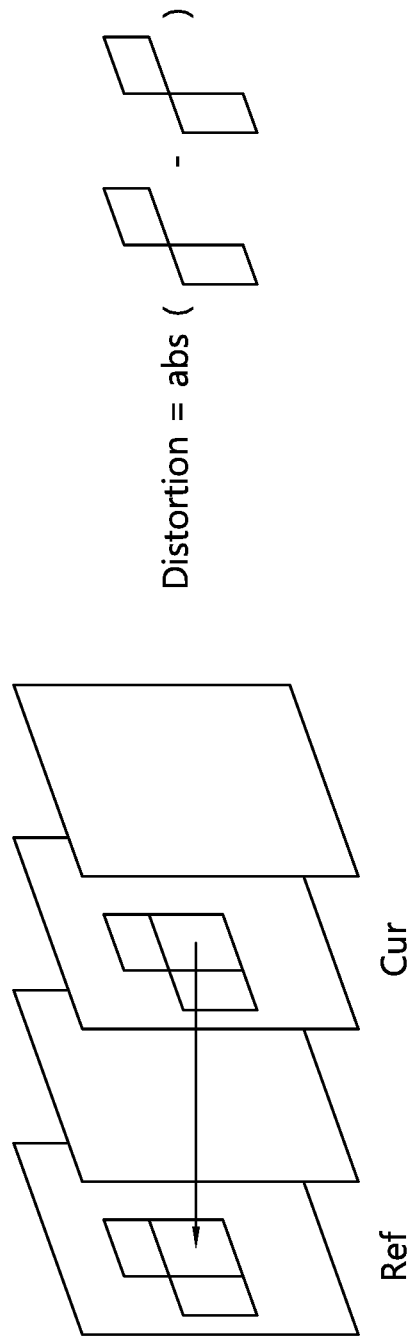
FIG. 4 illustrates an example of deriving cost for an MVP candidate of a current block through a template matching method.

FIG. 4 illustrates an example of deriving the cost for the MVP candidate of the current block through the template matching method.

Referring to FIG. 4, the cost for the MVP candidate may be derived based on sample values of neighboring samples of the current block and sample values of neighboring samples of a candidate block indicated by the MVP candidate. Referring to FIG. 4, the neighboring samples of the current block may include left neighboring samples and top neighboring samples which may be referred (casual) in the current block. Further, referring to FIG. 4, a predetermined neighboring region of the current block may be set as the template of the current block and the cost of the MVP candidate may be derived by using the template of the candidate block indicated by the MVP candidate on a reference picture. Here, the template of the candidate block for the MVP candidate may have the same size as the template of the current block. Further, the left neighboring samples and the top neighboring samples of the current block may be already decoded at a decoding time of the current block. Therefore, since the left and top neighboring samples may be used during a motion estimation process of the decoding apparatus, the left and top neighboring samples may be included in the template of the current block. In other words, the template of the current block may be a specific region including the left and top neighboring samples. Here, the cost may be derived as a sum of absolute difference between samples corresponding to the template of the current block and the template of the candidate block. For example, the cost may be derived based on the following equation.

$$Cost_{distortion} = \sum_{(i,j) \in TemplateSize} |Temp_{ref}(i, j) - Temp_{cur}(i, j)| \quad \text{[Equation 1]}$$

Here, i, and j represent the location (i, j) of the sample in the template of the block, $Cost_{distortion}$ represents the cost, $Temp_{ref}$ represents the sample value of the template of the candidate block, and $Temp_{cur}$ represents the sample value of the template of the current block. Differences between corresponding samples between the template of the candidate block and the template of the current block may be accumulated and the accumulation of the differences may be used as the cost for the MVP candidate.

The encoding apparatus/decoding apparatus may reorder the MVP candidates based on the costs for the MVP candidates of the MVP candidate list (S320). For example, the encoding apparatus/decoding apparatus may reorder the MVP candidates in order of small cost. Alternatively, as another example, the encoding apparatus/decoding apparatus may reorder the MVP candidates in order of smallest cost. Here, the MVP candidate may also be referred to as an AMVP candidate.

The encoding apparatus/decoding apparatus may derive a refine MVP candidate for the reordered MVP candidate of the MVP candidate list (S330). When there is a plurality of reordered MVP candidates, the refine MVP candidates may be derived in the reordering order. For example, the refine MVP candidate may be derived by refining the motion vector of the reordered MVP candidate. Specifically, the encoding apparatus/decoding apparatus may derive a template having small cost with the template of the current block among templates of reference blocks included in a predetermined neighboring region of a candidate block indicated by the reordered MVP candidate. The encoding apparatus/decoding apparatus may derive a motion vector indicating the reference block of the derived template as a refine motion vector. In other words, the encoding apparatus/decoding apparatus may derive a modified motion vector indicating the reference block of the derived template as the refine MVP candidate. The encoding apparatus/decoding apparatus may derive an order of the refine MVP candidate in the MVP candidate list prior to the order of the reordered MVP candidate. In other words, the encoding apparatus/decoding apparatus may allocate a value of an index for the refine MVP candidate as a value smaller than a value of an index for the reordered MVP candidate.

The encoding apparatus/decoding apparatus may derive the modified MVP candidate list by selecting a specific number of candidates among the MVP candidates and the refine MVP candidates (S340). For example, when five MVP candidates are derived and one refine MVP candidate is derived, the encoding apparatus/decoding apparatus may select two candidates among the six candidates and derive the modified MVP candidate list based on the two candidates. Further, the encoding apparatus may signal information on the selected candidates.

Meanwhile, the method for constructing the MVP candidate of the current block will be described as described below.

For example, a type and a check order of the motion information which may be constituted by the MVP candidate for the current block may be derived as shown in a table below.

TABLE 1

A1
B1
B0
A0
~~ATMVP~~

TABLE 1-continued

~~STMVP~~
B2
TMVP
~~Combined~~
Zero

As shown in Table 1 above, for uniformity with the merge mode, neighboring blocks at the same location as the merge mode may be checked, and the order of checking the neighboring blocks may be set in the same manner. However, unlike the merge mode, since the MVD is signaled in the AMVP mode, it may not be appropriate to construct an MVP candidate including a motion vector of a subblock unit. Accordingly, as shown in Table 1, ATMVP and STMVP including motion vectors of the subblock unit may not be considered as the MVP candidate of the current block. Further, since a combined bi-pred candidate is generated by combining the L0 motion vector and the L1 motion vector, the combined bi-pred may not be appropriate for the AMVP mode for deriving different MVPs for each of the L0 prediction and the L1 prediction. Accordingly, the combined bi-pred candidate may not be considered as the MVP candidate. Here, the L0 prediction may indicate a uni-prediction performed based on the L0 motion information and the L1 prediction may indicate a uni-prediction performed based on the L1 motion information.

A1 represents a motion vector of the left neighboring block of the current block, B1 represents a motion vector of the top neighboring block of the current block, B0 represents a motion vector of a top right neighboring block of the current block, A0 represents a motion vector of a bottom left neighboring block of the current block, ATMVP represents a motion vector of a co-located block indicated by motion information of a specific neighboring block of the current block, STMVP represents motion information derived based on motion information of a spatial neighboring block of the current block and motion information of a temporal neighboring block, B2 represents motion information of a top left neighboring block of the current block, TMVP represents the motion vector of the temporal neighboring block of the current block, Combined represents motion information derived by combining the motion information of the neighboring blocks of the current block, and Zero represents a motion vector having a value of 0.

Meanwhile, when the size of the current block is W×H and an x component of a top-left sample position of the current block is 0 and a y component is 0, the left neighboring block may be a block including a top-left sample of coordinate (−1, H−1), the top neighboring block may be a block including a top-left sample of coordinate (W−1, −1), the top-right neighboring block may be a block including a top-left sample of coordinate (W, −1), the bottom-left neighboring block may be a block including a top-left sample of coordinate (−1, H), and the top-left neighboring block may be a block including a top-left sample of coordinate (−1, −1).

The method for constructing the MVP candidate list like the configuration order of the merge candidate list as described above may be proposed.

In the case of the conventional method for constructing the MVP candidate list, one of the A0 and the A1 may be derived as the MVP candidate of the current block and one of the B0, the B1, and the B2 may be derived as the MVP candidate of the current block.

Figure 5:
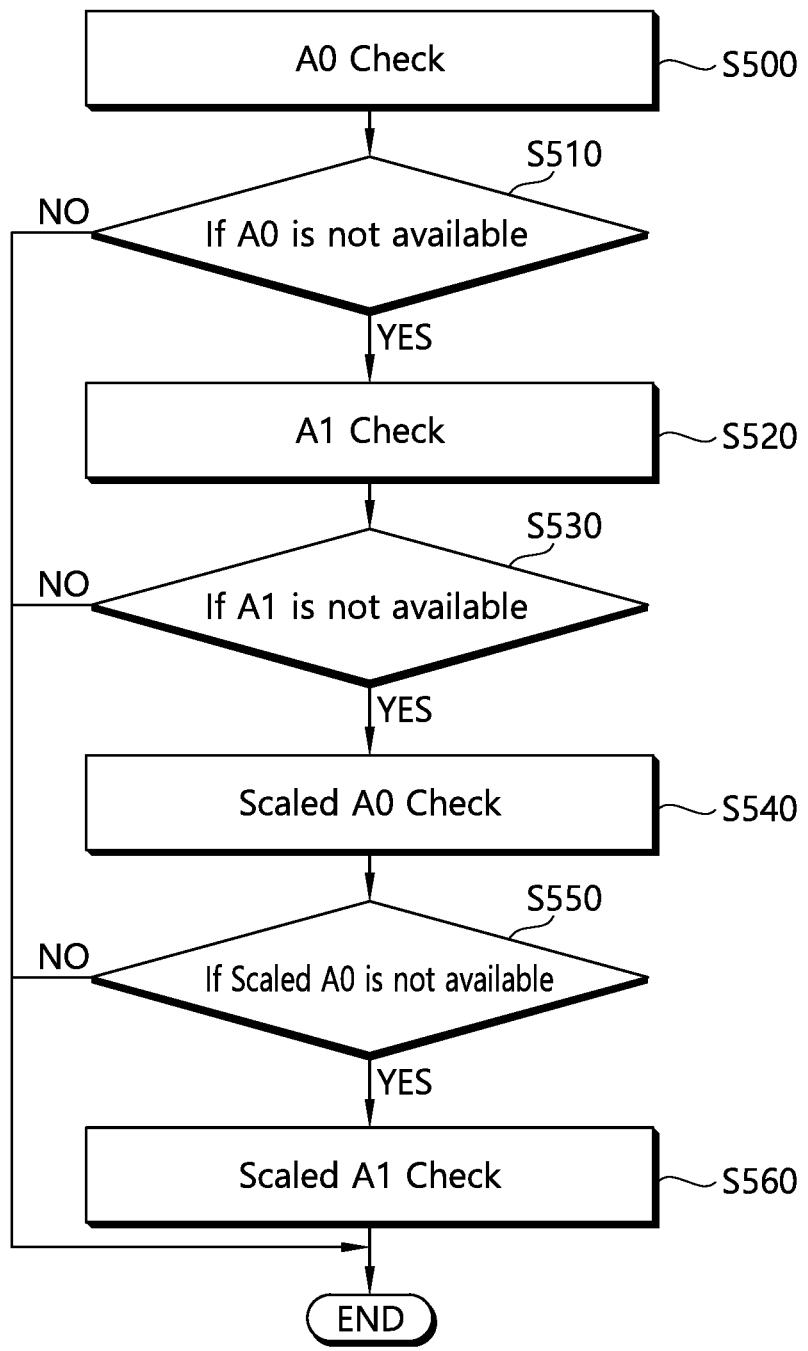
FIG. 5 illustrates an example of deriving the MVP candidate of the MVP candidate list based on A0 and A1.

FIG. 5 illustrates an example of deriving the MVP candidate of the MVP candidate list based on the A0 and the A1.

The encoding apparatus/decoding apparatus may select one MVP candidate among the motion vectors of the neighboring block A0 and the neighboring block A1 at a left side and a bottom left side of the current block. Referring to FIG. 5, the encoding apparatus/decoding apparatus may check the motion vector of the neighboring block A0 (S500). For example, when reference pictures indicated by a reference picture index of the current block and the reference picture index of the neighboring block A0 are the same as each other and the reference pictures indicated by the reference picture index of the current block and the reference picture index of the neighboring block A0 are included in the same reference picture list, the encoding apparatus/decoding apparatus may derive the motion vector of the neighboring block A0 as the MVP candidate. Further, when the neighboring block A0 is not available with respect to the reference picture list including the reference picture indicated by the reference picture index of the current block, the encoding apparatus/decoding apparatus may derive the motion vector of the neighboring block A0 as the MVP candidate when the reference pictures indicated by the reference picture index of the current block and the reference picture index of the neighboring block A0 are the same as each other and the reference pictures indicated by the reference picture index of the current block and the reference picture index of the neighboring block A0 are included in different reference picture lists. In other words, when the reference picture indicated by the reference picture index of the neighboring block A0 is included in the same reference picture list as the reference picture indicated by the reference picture index of the current block and both the reference pictures are the same picture, the encoding apparatus/decoding apparatus may derive the motion vector of the neighboring block A0 as the MVP candidate. Further, even though the reference picture indicated by the reference picture index of the neighboring block A0 is not included in the same reference picture list as the reference picture indicated by the reference picture index of the current block but included in the different reference picture list, when both the reference pictures are the same picture, the encoding apparatus/decoding apparatus may derive the motion vector of the neighboring block A0 as the MVP candidate.

The encoding apparatus/decoding apparatus may determine whether the neighboring block A0 is not available (S510). When the MVP candidate is not derived through the check process for the neighboring block A0, the encoding apparatus/decoding apparatus may determine that the neighboring block A0 is not available.

When the neighboring block A0 is not available, the encoding apparatus/decoding apparatus may check the motion vector of the neighboring block A1 (S520). The encoding apparatus/decoding apparatus may perform the same check process as the check process for the neighboring block A0 with respect to the neighboring block A1. For example, when reference pictures indicated by a reference picture index of the current block and the reference picture index of the neighboring block A1 are the same as each other and the reference pictures indicated by the reference picture index of the current block and the reference picture index of the neighboring block A1 are included in the same reference picture list, the encoding apparatus/decoding apparatus may derive the motion vector of the neighboring block A1 as the MVP candidate. Further, when the neighboring block A1 is not available with respect to the reference picture list including the reference picture indicated by the reference picture index of the current block, the encoding apparatus/decoding apparatus may derive the motion vector of the neighboring block A1 as the MVP candidate when the reference pictures indicated by the reference picture index of the current block and the reference picture index of the neighboring block A1 are the same as each other and the reference pictures indicated by the reference picture index of the current block and the reference picture index of the neighboring block A1 are included in different reference picture lists. In other words, when the reference picture indicated by the reference picture index of the neighboring block A1 is included in the same reference picture list as the reference picture indicated by the reference picture index of the current block and both the reference pictures are the same picture, the encoding apparatus/decoding apparatus may derive the motion vector of the neighboring block A1 as the MVP candidate. Further, even though the reference picture indicated by the reference picture index of the neighboring block A1 is not included in the same reference picture list as the reference picture indicated by the reference picture index of the current block but included in the different reference picture list, when both the reference pictures are the same picture, the encoding apparatus/decoding apparatus may derive the motion vector of the neighboring block A1 as the MVP candidate.

The encoding apparatus/decoding apparatus may determine whether the neighboring block A1 is not available (S530). When the MVP candidate is not derived through the check process for the neighboring block A1, the encoding apparatus/decoding apparatus may determine that the neighboring block A1 is not available.

When the neighboring block A1 is not available, the encoding apparatus/decoding apparatus may derive a motion vector scaled by scaling the motion vector of the neighboring block A0 and derive the motion vector scaledA0 as the MVP candidate of the current block (S540). The encoding apparatus/decoding apparatus may scale the motion vector A0 for a reference picture different from the reference picture of the current block and derive the scaled motion vector scaledA0 as the MVP candidate.

Meanwhile, when the motion vector scaledA0 is not available, the encoding apparatus/decoding apparatus may derive motion vector scaledA1 by scaling the motion vector of the neighboring block A1 and derive the motion vector scaledA1 as the MVP candidate of the current block (S550). The encoding apparatus/decoding apparatus may scale the motion vector A1 for a reference picture different from the reference picture of the current block and derive the scaled motion vector scaledA1 as the MVP candidate.

Meanwhile the same process as the method for deriving the MVP candidate based on the motion vectors for the neighboring block A0 and the neighboring block A1 may be performed with respect to the motion vectors for a neighboring block B0, a neighboring block B1, and a neighboring block B2. For example, the neighboring block B0, the neighboring block B1, and the neighboring block B2 may be checked in order and when the neighboring block B0, the neighboring block B1, and the neighboring block B2 are not available, a motion vector scaledB0, a motion vector scacledB1, and a motion vector scaledB2 may be checked in order.

Figure 6:
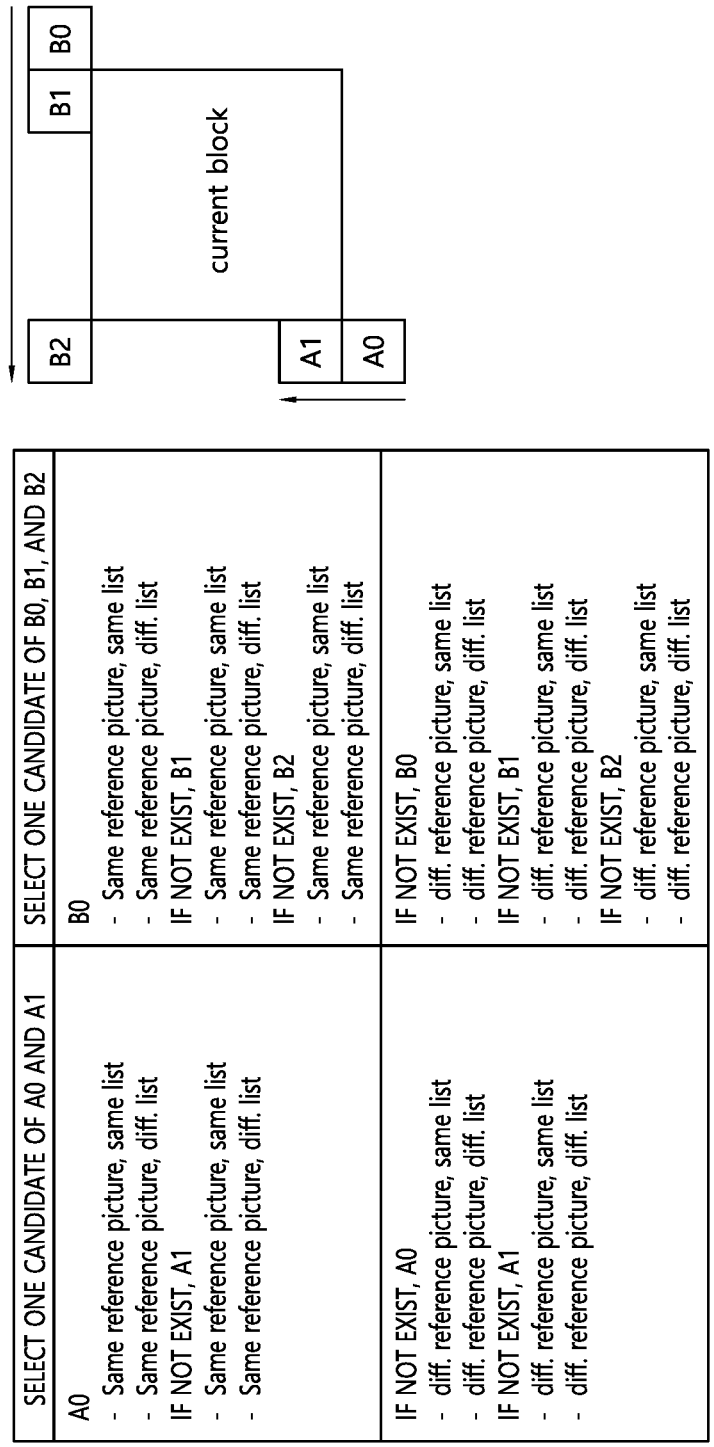
FIG. 6 illustrates an example of constructing the MVP candidate list through the existing order.

FIG. 6 illustrates an example of constructing the MVP candidate list through the existing order. Referring to FIG. 6, one of the A0 and the A1 may be derived as the MVP candidate of the current block and one of the B0, the B1, and the B2 may be derived as the MVP candidate of the current block. An order of deriving the MVP candidate based on the A0 and the A1 may be as follows.

Specifically, for example, if the reference picture indicated by the reference picture index for the current block is a specific reference picture included in a specific reference picture list, when there is first motion information of the neighboring block A0 including the reference picture index indicating the specific reference picture included in the specific reference picture list, a first motion vector included in the first motion information may be derived as the MVP candidate of the current block.

When the first motion information does not exist and second motion information of the neighboring block A0 including the reference picture index indicating the specific reference picture included in the reference picture list other than the specific reference picture list exists, a second motion vector included in the second motion information may be derived as the MVP candidate of the current block.

When the first motion information and the second motion information do not exist and third motion information of the neighboring block A1 including the reference picture index indicating the specific reference picture included in the specific reference picture list exists, a third motion vector included in the third motion information may be derived as the MVP candidate of the current block.

When the first motion information, the second motion information, and the third motion information do not exist and fourth motion information of the neighboring block A1 including the reference picture index indicating the specific reference picture included in the reference picture list other than the specific reference picture list exists, a fourth motion vector included in the fourth motion information may be derived as the MVP candidate of the current block.

When the first motion information, the second motion information, the third motion information, and the fourth motion information do not exist and fifth motion information of the neighboring block A0 including the reference picture index indicating the reference picture other than the specific reference picture included in the specific reference picture list exists, a fifth motion vector included in the fifth motion information may be derived as the MVP candidate of the current block.

When the first motion information, the second motion information, the third motion information, the fourth motion information, and the fifth motion information do not exist and sixth motion information of the neighboring block A0 including the reference picture index indicating the reference picture other than the specific reference picture included in the reference picture list other than the specific reference picture list exists, a sixth motion vector included in the sixth motion information may be derived as the MVP candidate of the current block.

When the first motion information, the second motion information, the third motion information, the fourth motion information, the fifth motion information, and the sixth motion information do not exist and seventh motion information of the neighboring block A1 including the reference picture index indicating the reference picture other than the specific reference picture included in the specific reference picture list exists, a seventh motion vector included in the seventh motion information may be derived as the MVP candidate of the current block.

When the first motion information, the second motion information, the third motion information, the fourth motion information, the fifth motion information, the sixth motion information, and the seventh motion information do not exist and eighth motion information of the neighboring block A1 including the reference picture index indicating the reference picture other than the specific reference picture included in the reference picture list other than the specific reference picture list exists, an eighth motion vector included in the eighth motion information may be derived as the MVP candidate of the current block.

Meanwhile, an order of deriving the MVP candidate based on the B0, the B1, and the B2 may be as follows.

Specifically, for example, if the reference picture indicated by the reference picture index for the current block is a specific reference picture included in a specific reference picture list, when there is first motion information of the neighboring block B0 including the reference picture index indicating the specific reference picture included in the specific reference picture list, a first motion vector included in the first motion information may be derived as the MVP candidate of the current block.

When the first motion information does not exist and second motion information of the neighboring block B0 including the reference picture index indicating the specific reference picture included in the reference picture list other than the specific reference picture list exists, a second motion vector included in the second motion information may be derived as the MVP candidate of the current block.

When the first motion information and the second motion information do not exist and third motion information of the neighboring block B1 including the reference picture index indicating the specific reference picture included in the specific reference picture list exists, a third motion vector included in the third motion information may be derived as the MVP candidate of the current block.

When the first motion information, the second motion information, and the third motion information do not exist and fourth motion information of the neighboring block B1 including the reference picture index indicating the specific reference picture included in the reference picture list other than the specific reference picture list exists, a fourth motion vector included in the fourth motion information may be derived as the MVP candidate of the current block.

When the first motion information, the second motion information, the third motion information, and the fourth motion information do not exist and fifth motion information of the neighboring block B2 including the reference picture index indicating the specific reference picture included in the specific reference picture list exists, a fifth motion vector included in the fifth motion information may be derived as the MVP candidate of the current block.

When the first motion information, the second motion information, the third motion information, the fourth motion information, and the fifth motion information do not exist and sixth motion information of the neighboring block B2 including the reference picture index indicating the specific reference picture including in the reference picture list other than the specific reference picture list exists, a sixth motion vector included in the sixth motion information may be derived as the MVP candidate of the current block.

When the first motion information, the second motion information, the third motion information, the fourth motion information, the fifth motion information, and the sixth motion information do not exist and seventh motion information of the neighboring block B0 including the reference picture index indicating the reference picture other than the specific reference picture included in the specific reference picture list exists, a seventh motion vector included in the seventh motion information may be derived as the MVP candidate of the current block.

When the first motion information, the second motion information, the third motion information, the fourth motion information, the fifth motion information, the sixth motion information, and the seventh motion information do not exist and eighth motion information of the neighboring block B0 including the reference picture index indicating the reference picture other than the specific reference picture included in the reference picture list other than the specific reference picture list exists, an eighth motion vector included in the eighth motion information may be derived as the MVP candidate of the current block.

When the first motion information, the second motion information, the third motion information, the fourth motion information, the fifth motion information, the sixth motion information, the seventh motion information, and the eighth motion information do not exist and ninth motion information of the neighboring block B1 including the reference picture index indicating the reference picture other than the specific reference picture included in the specific reference picture list exists, a ninth motion vector included in the ninth motion information may be derived as the MVP candidate of the current block.

When the first motion information, the second motion information, the third motion information, the fourth motion information, the fifth motion information, the sixth motion information, the seventh motion information, the eighth motion information, and the ninth motion information do not exist and tenth motion information of the neighboring block B1 including the reference picture index indicating the reference picture other than the specific reference picture included in the reference picture list other than the specific reference picture list exists, a tenth motion vector included in the tenth motion information may be derived as the MVP candidate of the current block.

When the first motion information, the second motion information, the third motion information, the fourth motion information, the fifth motion information, the sixth motion information, the seventh motion information, the eighth motion information, the ninth motion information, and the tenth motion information do not exist and eleventh motion information of the neighboring block B2 including the reference picture index indicating the reference picture other than the specific reference picture included in the specific reference picture list exists, an eleventh motion vector included in the eleventh motion information may be derived as the MVP candidate of the current block.

When the first motion information, the second motion information, the third motion information, the fourth motion information, the fifth motion information, the sixth motion information, the seventh motion information, the eighth motion information, the ninth motion information, the tenth motion information, and the eleventh motion information do not exist and twelfth motion information of the neighboring block B2 including the reference picture index indicating the reference picture other than the specific reference picture included in the reference picture list other than the specific reference picture list exists, a twelfth motion vector included in the twelfth motion information may be derived as the MVP candidate of the current block.

Meanwhile, the method for constructing the MVP candidate list proposed by the present disclosure may include a maximum of five MVP candidates other than a maximum of two MVP candidates, and as a result, an existing configuration method of deriving one MVP candidate in the A0 and the A1 and deriving one MVP candidate based on the B0, the B1, and the B2 needs to be changed.

Figure 7:
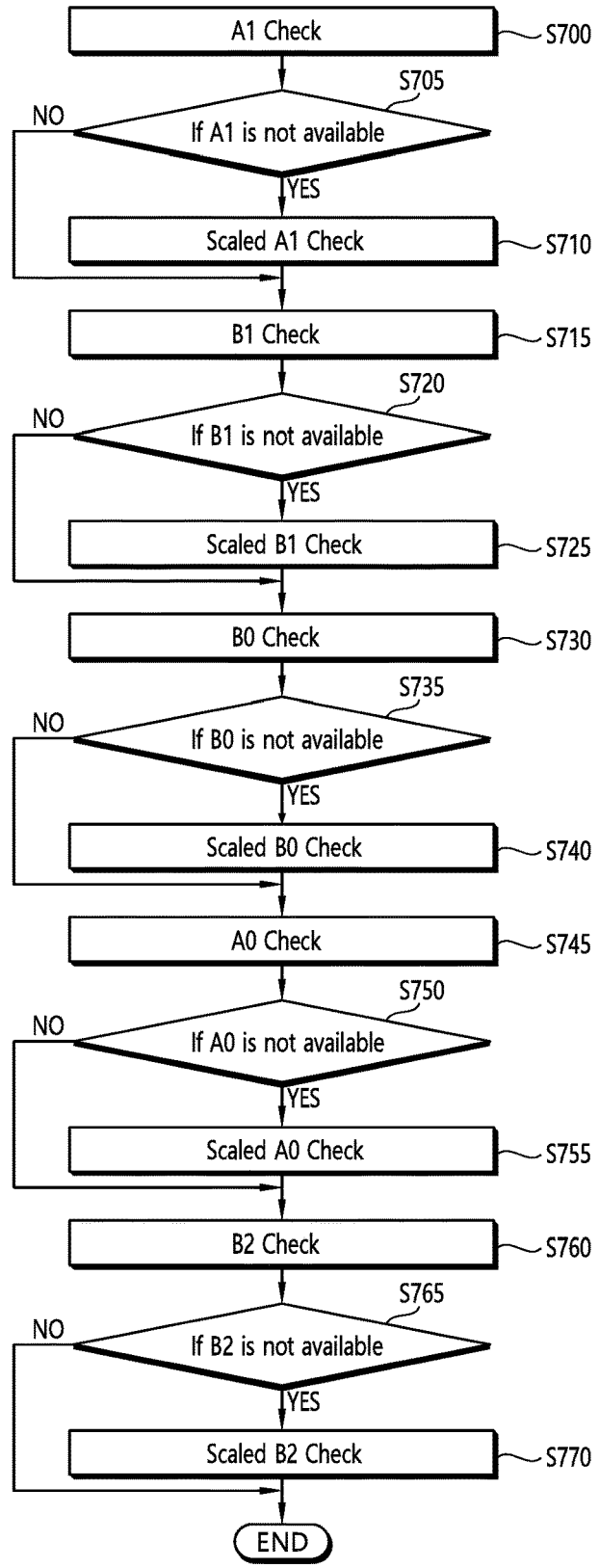
FIG. 7 illustrates an example of constructing the MVP candidate list based on neighboring blocks of the current block.

FIG. 7 illustrates an example of constructing the MVP candidate list through neighboring blocks of the current block.

Referring to FIG. 7, the encoding apparatus/decoding apparatus may check a neighboring block A1 of a current block (S700). For example, if the reference picture indicated by the reference picture index for the current block is a specific reference picture included in a specific reference picture list, when there is first motion information of the neighboring block A1 including the reference picture index indicating the specific reference picture included in the specific reference picture list, the encoding apparatus/decoding apparatus may derive a first motion vector included in the first motion information as the MVP candidate of the current block.

When the first motion information of the neighboring block A1 does not exist and second motion information of the neighboring block A1 including the reference picture index indicating the specific reference picture included in the reference picture list other than the specific reference picture list exists, the encoding apparatus/decoding apparatus may derive a second motion vector included in the second motion information as the MVP candidate of the current block.

The encoding apparatus/decoding apparatus may determine whether the neighboring block A1 is not available (S705). When the MVP candidate is not derived through the check process for the neighboring block A1, the encoding apparatus/decoding apparatus may determine that the neighboring block A1 is not available. When the first motion vector and the second motion vector of the neighboring block A1 do not exist, the encoding apparatus/decoding apparatus may determine that the neighboring block A1 is not available.

When the neighboring block A1 is not available, the encoding apparatus/decoding apparatus may scale a third motion vector included in third motion information of the neighboring block A1 including the reference picture index indicating the reference picture other than the specific reference picture and derive the scaled motion vector as the MVP candidate of the current block (S710). Here, the scaled motion vector may be represented by scaled A1.

The encoding apparatus/decoding apparatus may check a neighboring block B1 of the current block (S715). For example, if the reference picture indicated by the reference picture index for the current block is a specific reference picture included in a specific reference picture list, when there is first motion information of the neighboring block B1 including the reference picture index indicating the specific reference picture included in the specific reference picture list, the encoding apparatus/decoding apparatus may derive a first motion vector included in the first motion information as the MVP candidate of the current block.

When the first motion information of the neighboring block B1 does not exist and second motion information of the neighboring block B1 including the reference picture index indicating the specific reference picture included in the reference picture list other than the specific reference picture list exists, the encoding apparatus/decoding apparatus may derive a second motion vector included in the second motion information as the MVP candidate of the current block.

The encoding apparatus/decoding apparatus may determine whether the neighboring block B1 is not available (S720). When the MVP candidate is not derived through the check process for the neighboring block B1, the encoding apparatus/decoding apparatus may determine that the neighboring block B1 is not available. When the first motion vector and the second motion vector of the neighboring block B1 do not exist, the encoding apparatus/decoding apparatus may determine that the neighboring block B1 is not available.

When the neighboring block B1 is not available, the encoding apparatus/decoding apparatus may scale a third motion vector included in third motion information of the neighboring block B1 including the reference picture index indicating the reference picture other than the specific reference picture and derive the scaled motion vector as the MVP candidate of the current block (S725). Here, the scaled motion vector may be represented by scaled B1.

The encoding apparatus/decoding apparatus may check a neighboring block B0 of the current block (S730). For example, if the reference picture indicated by the reference picture index for the current block is a specific reference picture included in a specific reference picture list, when there is first motion information of the neighboring block B0 including the reference picture index indicating the specific reference picture included in the specific reference picture list, the encoding apparatus/decoding apparatus may derive a first motion vector included in the first motion information as the MVP candidate of the current block.

When the first motion information of the neighboring block B0 does not exist and second motion information of the neighboring block B0 including the reference picture index indicating the specific reference picture included in the reference picture list other than the specific reference picture list exists, the encoding apparatus/decoding apparatus may derive a second motion vector included in the second motion information as the MVP candidate of the current block.

The encoding apparatus/decoding apparatus may determine whether the neighboring block B0 is not available (S735). When the MVP candidate is not derived through the check process for the neighboring block B0, the encoding apparatus/decoding apparatus may determine that the neighboring block B0 is not available. When the first motion vector and the second motion vector of the neighboring block B0 do not exist, the encoding apparatus/decoding apparatus may determine that the neighboring block B0 is not available.

When the neighboring block B0 is not available, the encoding apparatus/decoding apparatus may scale a third motion vector included in third motion information of the neighboring block B0 including the reference picture index indicating the reference picture other than the specific reference picture and derive the scaled motion vector as the MVP candidate of the current block (S740). Here, the scaled motion vector may be represented by scaled B0.

The encoding apparatus/decoding apparatus may check a neighboring block A0 of the current block (S745). For example, if the reference picture indicated by the reference picture index for the current block is a specific reference picture included in a specific reference picture list, when there is first motion information of the neighboring block A0 including the reference picture index indicating the specific reference picture included in the specific reference picture list, the encoding apparatus/decoding apparatus may derive a first motion vector included in the first motion information as the MVP candidate of the current block.

When the first motion information of the neighboring block A0 does not exist and second motion information of the neighboring block A0 including the reference picture index indicating the specific reference picture included in the reference picture list other than the specific reference picture list exists, the encoding apparatus/decoding apparatus may derive a second motion vector included in the second motion information as the MVP candidate of the current block.

The encoding apparatus/decoding apparatus may determine whether the neighboring block A0 is not available (S750). When the MVP candidate is not derived through the check process for the neighboring block A0, the encoding apparatus/decoding apparatus may determine that the neighboring block A0 is not available. When the first motion vector and the second motion vector of the neighboring block A0 do not exist, the encoding apparatus/decoding apparatus may determine that the neighboring block A0 is not available.

When the neighboring block A0 is not available, the encoding apparatus/decoding apparatus may scale a third motion vector included in third motion information of the neighboring block A0 including the reference picture index indicating the reference picture other than the specific reference picture and derive the scaled motion vector as the MVP candidate of the current block (S755). Here, the scaled motion vector may be represented by scaled A0.

The encoding apparatus/decoding apparatus may check a neighboring block B2 of the current block (S760). For example, if the reference picture indicated by the reference picture index for the current block is a specific reference picture included in a specific reference picture list, when there is first motion information of the neighboring block B2 including the reference picture index indicating the specific reference picture included in the specific reference picture list, the encoding apparatus/decoding apparatus may derive a first motion vector included in the first motion information as the MVP candidate of the current block.

When the first motion information of the neighboring block B2 does not exist and second motion information of the neighboring block B2 including the reference picture index indicating the specific reference picture included in the reference picture list other than the specific reference picture list exists, the encoding apparatus/decoding apparatus may derive a second motion vector included in the second motion information as the MVP candidate of the current block.

The encoding apparatus/decoding apparatus may determine whether the neighboring block B2 is not available (S765). When the MVP candidate is not derived through the check process for the neighboring block B2, the encoding apparatus/decoding apparatus may determine that the neighboring block B2 is not available. When the first motion vector and the second motion vector of the neighboring block B2 do not exist, the encoding apparatus/decoding apparatus may determine that the neighboring block B2 is not available.

When the neighboring block B2 is not available, the encoding apparatus/decoding apparatus may scale a third motion vector included in third motion information of the neighboring block B2 including the reference picture index indicating the reference picture other than the specific reference picture and derive the scaled motion vector as the MVP candidate of the current block (S770). Here, the scaled motion vector may be represented by scaled B2.

Meanwhile, the order of deriving the MVP candidate in order to construct the MVP candidate list may be changed. For example, the encoding apparatus/decoding apparatus may derive the MVP candidate by checking the spatial neighboring blocks of the current block in the order of the neighboring block A1, the neighboring block B1, the neighboring block B0, the neighboring block A0, and the neighboring block B2 and when the number of derived MVP candidates is smaller than a maximum number (e.g., 5), the encoding/decoding apparatus may construct the MVP candidate list including the maximum number of MVP candidates by adding the spatial neighboring blocks in the order of scaled A1, scaled B1, scaled B0, scaled A0, and scaled B2. Here, the scaled A1 may represent a motion vector derived by scaling the motion vector of the neighboring block A1, the scaled B1 may represent a motion vector derived by scaling the motion vector of the neighboring block B1, the scaled B0 may represent a motion vector derived by scaling the motion vector of the neighboring block B0, the scaled A0 may represent a motion vector derived by scaling the motion vector of the neighboring block A0, and the scaled B2 may represent a motion vector derived by scaling the motion vector of the neighboring block B2.

Figure 8:
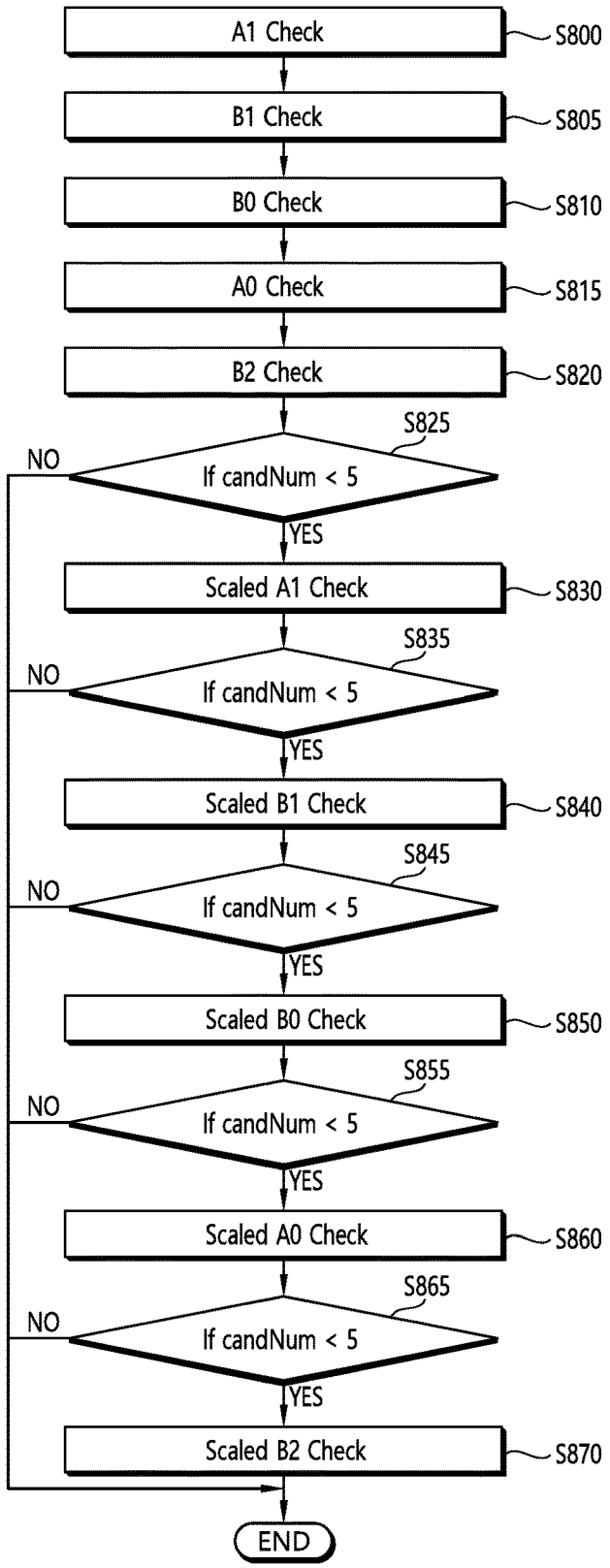
FIG. 8 exemplarily illustrates cost according to a location and a size of a template.

FIG. 8 illustrates an example of constructing the MVP candidate list through neighboring blocks of the current block.

Referring to FIG. 8, the encoding apparatus/decoding apparatus may check a neighboring block A1 of a current block (S800). For example, if the reference picture indicated by the reference picture index for the current block is a specific reference picture included in a specific reference picture list, when there is first motion information of the neighboring block A1 including the reference picture index indicating the specific reference picture included in the specific reference picture list, the encoding apparatus/decoding apparatus may derive a first motion vector included in the first motion information as the MVP candidate of the current block.

When the first motion information of the neighboring block A1 does not exist and second motion information of the neighboring block A1 including the reference picture index indicating the specific reference picture included in the reference picture list other than the specific reference picture list exists, the encoding apparatus/decoding apparatus may derive a second motion vector included in the second motion information as the MVP candidate of the current block.

The encoding apparatus/decoding apparatus may check a neighboring block B1 of the current block (S805). For example, if the reference picture indicated by the reference picture index for the current block is a specific reference picture included in a specific reference picture list, when there is first motion information of the neighboring block B1 including the reference picture index indicating the specific reference picture included in the specific reference picture list, the encoding apparatus/decoding apparatus may derive a first motion vector included in the first motion information as the MVP candidate of the current block.

When the first motion information of the neighboring block B1 does not exist and second motion information of the neighboring block B1 including the reference picture index indicating the specific reference picture included in the reference picture list other than the specific reference picture list exists, the encoding apparatus/decoding apparatus may derive a second motion vector included in the second motion information as the MVP candidate of the current block.

The encoding apparatus/decoding apparatus may check a neighboring block B0 of the current block (S810). For example, if the reference picture indicated by the reference picture index for the current block is a specific reference picture included in a specific reference picture list, when there is first motion information of the neighboring block B0 including the reference picture index indicating the specific reference picture included in the specific reference picture list, the encoding apparatus/decoding apparatus may derive a first motion vector included in the first motion information as the MVP candidate of the current block.

When the first motion information of the neighboring block B0 does not exist and second motion information of the neighboring block B0 including the reference picture index indicating the specific reference picture included in the reference picture list other than the specific reference picture list exists, the encoding apparatus/decoding apparatus may derive a second motion vector included in the second motion information as the MVP candidate of the current block.

The encoding apparatus/decoding apparatus may check a neighboring block A0 of the current block (S815). For example, if the reference picture indicated by the reference picture index for the current block is a specific reference picture included in a specific reference picture list, when there is first motion information of the neighboring block A0 including the reference picture index indicating the specific reference picture included in the specific reference picture list, the encoding apparatus/decoding apparatus may derive a first motion vector included in the first motion information as the MVP candidate of the current block.

When the first motion information of the neighboring block A0 does not exist and second motion information of the neighboring block A0 including the reference picture index indicating the specific reference picture included in the reference picture list other than the specific reference picture list exists, the encoding apparatus/decoding apparatus may derive a second motion vector included in the second motion information as the MVP candidate of the current block.

The encoding apparatus/decoding apparatus may check a neighboring block B2 of the current block (S820). For example, if the reference picture indicated by the reference picture index for the current block is a specific reference picture included in a specific reference picture list, when there is first motion information of the neighboring block B2 including the reference picture index indicating the specific reference picture included in the specific reference picture list, the encoding apparatus/decoding apparatus may derive a first motion vector included in the first motion information as the MVP candidate of the current block.

When the first motion information of the neighboring block B2 does not exist and second motion information of the neighboring block B2 including the reference picture index indicating the specific reference picture included in the reference picture list other than the specific reference picture list exists, the encoding apparatus/decoding apparatus may derive a second motion vector included in the second motion information as the MVP candidate of the current block.

The encoding apparatus/decoding apparatus may determine whether the number of derived MVP candidates is smaller than 5 (S825). When the number of derived MVP candidates is 5, the encoding apparatus/decoding apparatus may construct an MVP candidate list including the derived MVP candidates and may not further derive an additional MVP candidate.

When the number of derived MVP candidates is smaller than 5, the encoding apparatus/decoding apparatus may scale the motion vector of the neighboring block A1 and check the scaled vector (S830). For example, when the same MVP candidate as the scaled vector does not exist, the encoding apparatus/decoding apparatus may derive the scaled vector as the MVP candidate of the current block and when the same MVP candidate as the scaled vector exists, the encoding apparatus/decoding apparatus may not derive the scaled vector as the MVP candidate of the current block. The scaled vector may be represented by scaled A1.

The encoding apparatus/decoding apparatus may determine whether the number of derived MVP candidates is smaller than 5 (S835). When the number of derived MVP candidates is 5, the encoding apparatus/decoding apparatus may construct an MVP candidate list including the derived MVP candidates and may not further derive an additional MVP candidate.

When the number of derived MVP candidates is smaller than 5, the encoding apparatus/decoding apparatus may scale the motion vector of the neighboring block B1 and check the scaled vector (S840). For example, when the same MVP candidate as the scaled vector does not exist, the encoding apparatus/decoding apparatus may derive the scaled vector as the MVP candidate of the current block and when the same MVP candidate as the scaled vector exists, the encoding apparatus/decoding apparatus may not derive the scaled vector as the MVP candidate of the current block. The scaled vector may be represented by scaled B1.

The encoding apparatus/decoding apparatus may determine whether the number of derived MVP candidates is smaller than 5 (S845). When the number of derived MVP candidates is 5, the encoding apparatus/decoding apparatus may construct an MVP candidate list including the derived MVP candidates and may not further derive an additional MVP candidate.

When the number of derived MVP candidates is smaller than 5, the encoding apparatus/decoding apparatus may scale the motion vector of the neighboring block B0 and check the scaled vector (S850). For example, when the same MVP candidate as the scaled vector does not exist, the encoding apparatus/decoding apparatus may derive the scaled vector as the MVP candidate of the current block and when the same MVP candidate as the scaled vector exists, the encoding apparatus/decoding apparatus may not derive the scaled vector as the MVP candidate of the current block. The scaled vector may be represented by scaled B0.

The encoding apparatus/decoding apparatus may determine whether the number of derived MVP candidates is smaller than 5 (S855). When the number of derived MVP candidates is 5, the encoding apparatus/decoding apparatus may construct an MVP candidate list including the derived MVP candidates and may not further derive an additional MVP candidate.

When the number of derived MVP candidates is smaller than 5, the encoding apparatus/decoding apparatus may scale the motion vector of the neighboring block A0 and check the scaled vector (S860). For example, when the same MVP candidate as the scaled vector does not exist, the encoding apparatus/decoding apparatus may derive the scaled vector as the MVP candidate of the current block and when the same MVP candidate as the scaled vector exists, the encoding apparatus/decoding apparatus may not derive the scaled vector as the MVP candidate of the current block. The scaled vector may be represented by scaled A0.

The encoding apparatus/decoding apparatus may determine whether the number of derived MVP candidates is smaller than 5 (S865). When the number of derived MVP candidates is 5, the encoding apparatus/decoding apparatus may construct an MVP candidate list including the derived MVP candidates and may not further derive an additional MVP candidate.

When the number of derived MVP candidates is smaller than 5, the encoding apparatus/decoding apparatus may scale the motion vector of the neighboring block B2 and check the scaled vector (S870). For example, when the same MVP candidate as the scaled vector does not exist, the encoding apparatus/decoding apparatus may derive the scaled vector as the MVP candidate of the current block and when the same MVP candidate as the scaled vector exists, the encoding apparatus/decoding apparatus may not derive the scaled vector as the MVP candidate of the current block. The scaled vector may be represented by scaled B2.

Meanwhile, an MVP index indicating one candidate among the MVP candidates included in the constructed MVP candidate list may be signaled, and as a result, a duplicated check process is required so that various MVP candidates which do not overlap with each other without signaling overhead may be added to the MVP candidate list. Accordingly, for example, when a first MVP candidate and a second MVP candidate are the same as each other, i.e., when the first MVP candidate and the second MVP candidate are the same motion vector, an MVP candidate in a later order in the order of the MVP candidate list among the first and second MVP candidates may be removed through the duplicated check process.

For example, when the MVP candidate list is constituted by {C0, C1, C2, C3, C4} which is 5 spatial MVP candidates and/or temporal MVP candidates as below, the duplicated check process may be performed in the step of deriving each MVP candidate. Here, the spatial MVP candidate may represent an MVP candidate derived based on the motion vector of the spatial neighboring block of the current block and the temporal MVP candidate may represent an MVP candidate derived based on the motion vector of the temporal neighboring block of the current block.

First, the C0 may be derived as the MVP candidate of the current block. Next, it may be determined whether the C1 is available. When the C1 is available, a duplication check for the C0 and the C1 may be performed. For example, when the C1 is the same as the C0, i.e., when the C1 and the C0 are the same motion vector, the C1 may not be derived as the MVP candidate of the current block. When the C1 is not the same as the C0, i.e., when the C1 and the C0 are not the same motion vector, the C1 may be derived as the MVP candidate of the current block.

Next, it may be determined whether the C2 is available. When the C2 is available, the duplication check for the C0 and the C2 and the duplication check for the C1 and the C2 may be performed. For example, when the C2 is the same as the C0, i.e., when the C2 and the C0 are the same motion vector, the C2 may not be derived as the MVP candidate of the current block. Further, when the C2 is the same as the C1, i.e., when the C2 and the C1 are the same motion vector, the C2 may not be derived as the MVP candidate of the current block. When the C2 is not the same as the C0 and the C1, i.e., when the C2 is not the same motion vector as the C0 and the C1, the C2 may be derived as the MVP candidate of the current block.

Next, it may be determined whether the C3 is available. When the C3 is available, the duplication check for the C0 and the C3, the duplication check for the C1 and the C3, and the duplication check for the C2 and the C3 may be performed. For example, when the C3 is the same as the C0, i.e., when the C3 is the same vector as the C0, the C3 may not be derived as the MVP candidate of the current block. Further, when the C3 is the same as the C1, i.e., when the C3 is the same vector as the C1, the C3 may not be derived as the MVP candidate of the current block. Further, when the C3 is the same as the C2, i.e., when the C3 is the same vector as the C2, the C3 may not be derived as the MVP candidate of the current block. When the C3 is not the same as the C0, the C1, and the C2, i.e., when the C3 is not the same motion vector as the C0, the C1, and the C2, the C3 may be derived as the MVP candidate of the current block.

Next, it may be determined whether the C4 is available. When the C4 is available, the duplication check for the C0 and the C4, the duplication check for the C1 and the C4, the duplication check for the C2 and the C4, and the duplication check for the C3 and C4 may be performed. For example, when the C4 is the same as the C0, i.e., when the C4 is the same vector as the C0, the C4 may not be derived as the MVP candidate of the current block. Further, when the C4 is the same as the C1, i.e., when the C4 is the same vector as the C1, the C4 may not be derived as the MVP candidate of the current block. Further, when the C4 is the same as the C2, i.e., when the C4 is the same vector as the C2, the C4 may not be derived as the MVP candidate of the current block. Further, when the C4 is the same as the C3, i.e., when the C4 is the same vector as the C3, the C4 may not be derived as the MVP candidate of the current block. When the C4 is not the same as the C0, the C1, the C2, and the C3, i.e., when the C4 is not the same motion vector as the C0, the C1, the C2, and the C3, the C4 may be derived as the MVP candidate of the current block.

Meanwhile, when an adaptive motion vector resolution (AMVR) tool is applied to the current block, the MVP candidate may be rounded and then the duplication check may be performed based on the rounded motion vector. Further, even though the AMVR tool is applied to the current block, the duplication check for the MVP candidate may be performed based an unrounded motion vector of the MVP candidate. Meanwhile, the rounded motion vector, a motion vector removed through the duplicated check process, or the rounded motion vector removed through the duplicated check process may be stored as a candidate for an AMVP candidate list refinement (ALR).

When the MVP candidate list is constructed as described above, a reordering and/or refinement process for the MVP candidate list is performed through the ALR to derive a modified MVP candidate list. For example, when a predetermined peripheral region of the current block, i.e., the template of the current block is available, the reordering and/or refinement process for the MVP candidate list may be performed through the ALR. Specifically, the encoding apparatus/decoding apparatus may derive costs for MVP candidates included in the MVP candidate list of the current block and derive a modified MVP candidate list by performing a process of reordering the MVP candidates and/or a process of deriving a refine MVP candidate for a specific MVP candidate among the MVP candidates based on the costs. Meanwhile, when the template of the current block is not available, the reordering and/or refinement process for the MVP candidate list may not be performed. In this case, an MVP index for the MVP candidate list including the MVP candidates may be signaled in an order in which the MVP candidates are not reordered. Here, the cost of the MVP candidate may be derived as a sum of absolute difference (SAD) of the template of the current block and the template of the MVP candidate. Further, the template of the MVP candidate may represent the template of the reference block indicated by the MVP candidate and may be a region having the same size as the template of the current block.

When the modified MVP candidate list is derived by performing the reordering and/or refinement, a process of removing an MVP candidate representing a duplicated motion vector for the modified MVP candidate list may be performed. For example, the encoding apparatus/decoding apparatus may check whether there are MVP candidates representing the same motion vector and when there are MVP candidates representing the same motion information, MVP candidates other than an MVP candidate in a highest order among the MVP candidates may be removed from the modified MVP candidate list. A process of checking whether there is an MVP candidate representing the same motion information may be referred to as a pruning check. Meanwhile, the pruning check may be performed only with respect to reordered MVP candidates. In other words, when a reordering process for the MVP candidates of the MVP candidate list is performed, it may be determined whether there is an MVP candidate representing the same motion vector only for the motion vectors of the reordered MVP candidates. Through the determination, in the pruning check process, only a process of comparing the reordered MVP candidate and an MVP candidate in a higher order than the reordered MVP candidate may be performed and it is advantageous in that calculation complexity is reduced. Further, it may be determined whether there is the MVP candidate representing the same motion vector only for the motion vector of the refine MVP candidate derived by the refinement process. In addition, it may be determined whether there is the MVP candidate representing the same motion vector only for the MVP candidate representing the zero vector. Therefore, coding efficiency may be enhanced.

Meanwhile, when the refine MVP candidate is derived, the modified MVP candidate list may be constructed as described below.

Figure 9:
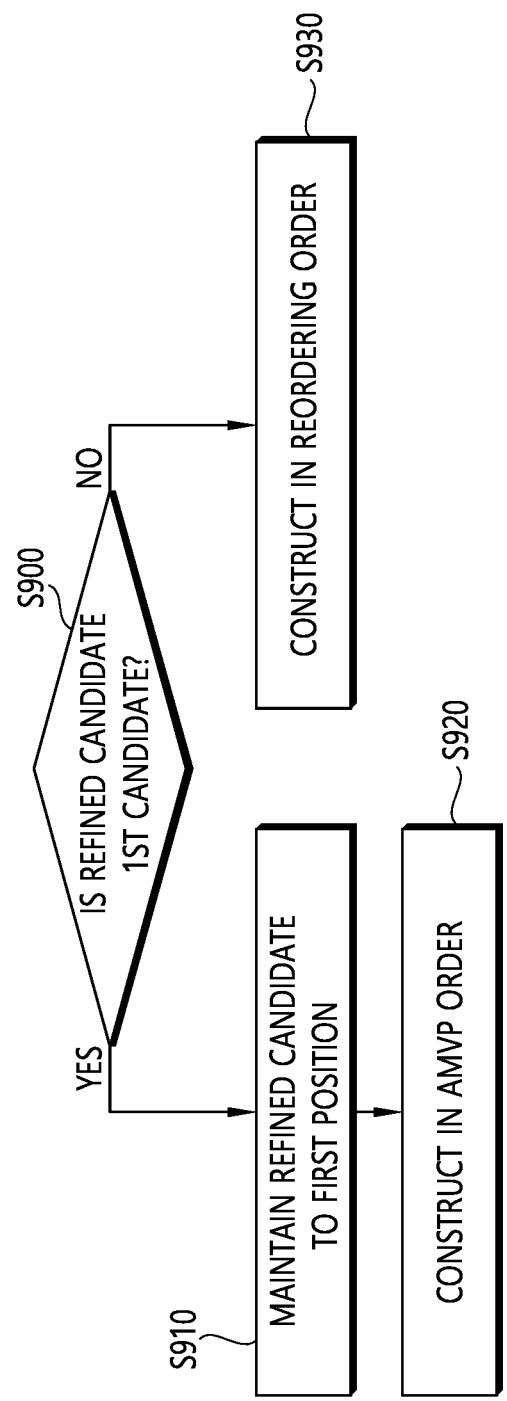
FIG. 9 illustrates an example of constructing a modified MVP candidate list including a refine MVP candidate.

FIG. 9 illustrates an example of constructing a modified MVP candidate list including a refine MVP candidate. Since a selection rate of the refine MVP candidate may vary depending on the location of the refine MVP candidate, a method for constructing a different modified MVP candidate list according to the order of the refine MVP candidate may be considered.

The encoding apparatus/decoding apparatus may determine whether the refine MVP candidate is a first-order MVP candidate in the reordering order (S900). When the refine MVP candidate is the first-order MVP candidate, the encoding apparatus/decoding apparatus may construct the modified MVP candidate list by reordering the refine MVP candidate in the first order (S910) and reordering other MVP candidates in the existing order of the MVP candidate list (S920). When the refine MVP candidate is not the first-order MVP candidate, the encoding apparatus/decoding apparatus may maintain the modified MVP candidate list (S930).

Meanwhile, a method for constructing the modified MVP candidate list different from the embodiment may be proposed. For example, a method for differentiating a modified MVP list configuration based on the order of the refine MVP candidate as illustrated in FIG. 9 may be proposed, but a method for constructing the modified MVP candidate list so as to maintain an MVP candidate in which cost derived based on the template is smaller than a specific threshold in the reordering order by comparing the cost derived based on the template with the specific threshold and maintain an MVP candidate in which the cost is larger than the specific threshold in the existing order of the MVP candidate list may be proposed. Further, a method for differentiating a reordering method according to a specific condition may be proposed and a method for continuously applying the same reordering method may also be proposed.

Meanwhile, a process of calculating the cost of the MVP candidate based on the template of the current block and the template of the reference block for the MVP candidate will be described below as follows.

For example, the cost of the MVP candidate may be derived by using the template of the current block and the template of the reference block indicated by the MVP candidate on the reference picture and the cost may be derived as a sum of absolute differences (SAD) between samples corresponding to the template of the current block and the template of the reference block. Accuracy of motion information may be predicted based on a similarity between adjacent regions of the current block and the reference block.

Figure 10:
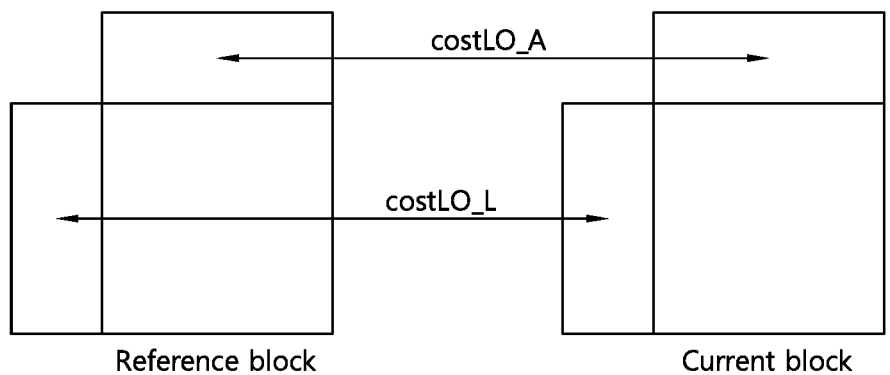
FIG. 10 illustrates an example of deriving the cost of the MVP candidate based on the template.

FIG. 10 illustrates an example of deriving the cost of the MVP candidate based on the template.

Referring to FIG. 10, the template of the current block may include a left neighboring region and/or a top neighboring region of the current block, the template of the reference block may be a region corresponding to the template of the current block, and the template of the reference block may include a left neighboring region and/or a top neighboring region of the reference block. When the left neighboring region and/or the top neighboring region of the current block are/is available, the cost of the MVP candidate may be calculated as the SAD for each neighboring region. In other words, for example, the cost may be calculated as an SAD of the left neighboring region of the current block and the left neighboring region of the reference block indicated by the MVP candidate and an SAD of the top neighboring region of the current block and the top neighboring region of the reference block indicated by the MVP candidate. Here, the top neighboring region included in the template of the current block may be referred to as a top template of the current block and the left neighboring region included in the template of the current block may be referred to as a left template of the current block. Further, the top neighboring region included in the template of the reference block may be referred to as the top template of the reference block and the left neighboring region included in the template of the reference block may be referred to as the left template of the reference block.

Meanwhile, motion information for the inter prediction may be bi-prediction motion information or uni-prediction motion information as described above. Here, the bi-prediction motion information may include an L0 reference picture index and an L0 motion vector (L0 motion information), and an L1 reference picture index and an L1 motion vector (L1 motion information) and the uni-prediction motion information may include the L0 reference picture index and the L0 motion vector (L0 motion information) or include the L1 reference picture index and the L1 motion vector (L1 motion information). The L0 represents a reference picture list L0 (List 0) and the L1 represents a reference picture list L1 (List 1).

The MVP candidate may represent an L0 motion vector or an L1 motion vector.

When the MVP candidate represents the L0 motion vector, the cost of the MVP candidate may be derived as an SAD of the template of the current block and the template of the L0 reference block indicated by the MVP candidate.

Specifically, the cost of the MVP candidate may be derived as a sum of cost L0_A of the top neighboring region of the current block and the top neighboring region of the reference block indicated by the MVP candidate and cost L0_L of the left neighboring region of the current block and the left neighboring region of the reference block indicated by the MVP candidate. The cost L0_A may be an SAD of the top neighboring region of the current block and the top neighboring region of the reference block and the cost L0_L may be an SAD of the left neighboring region of the current block and the left neighboring region of the reference block.

The cost of the MVP candidate may be derived based on the following equation.

$$costL0 = costL0\_A + costL0\_L \quad \text{[Equation 2]}$$

Here, costL0 represents the cost of the MVP candidate, costL0_A represents the cost L0_A of the MVP candidate, and costL0_L represents the cost L0_L of the MVP candidate.

Further, when the MVP candidate represents the L1 motion vector, the cost of the MVP candidate may be derived as an SAD of the template of the current block and the template of the L1 reference block indicated by the MVP candidate.

Specifically, the cost of the MVP candidate may be derived as a sum of cost L1_A of the top neighboring region of the current block and the top neighboring region of the reference block indicated by the MVP candidate and cost L1_L of the left neighboring region of the current block and the left neighboring region of the reference block indicated by the MVP candidate. The cost L1_A may be an SAD of the top neighboring region of the current block and the top neighboring region of the reference block and the cost L1_L may be an SAD of the left neighboring region of the current block and the left neighboring region of the reference block.

Cost L1 of the MVP candidate may be derived based on the following equation.

$$costL1 = costL1\_A + costL1\_L \quad \text{[Equation 3]}$$

Here, costL1 represents the cost L1 of the MVP candidate, costL1_A represents the cost L1_A of the MVP candidate, and costL1_L represents the cost L1_L of the MVP candidate.

Meanwhile, in the case of bi-prediction motion information including the L0 motion information and the L1 motion information, the cost of the bi-prediction motion information may be calculated by an average of the cost L0 and the cost L1. Here, the cost L0 may be derived as an SAD of the template of the current block and the template of the reference block indicated by the L0 motion information of the bi-prediction motion information and the cost L1 may be derived as an SAD of the template of the current block and the template of the reference block indicated by the L1 motion information of the bi-prediction motion information.

The cost of the bi-prediction motion information may be derived based on the following equation.

$$costBi = (costL0 + cost\_uniL1) >> 1 \quad \text{[Equation 4]}$$

Here, costBi represents the cost of the bi-prediction motion information, costL0 represents the cost L1 of the bi-prediction motion information, and costL1 represents the cost L1 of the bi-prediction motion information.

Meanwhile, whether the template is available may be determined based on the following condition.

Whether an actual sample exists

Whether slice or tile boundary exists

Whether to apply intra mode

In other words, whether the template is available may be determined based on whether the sample included in the template exists. Further, whether the template is available may be determined based on whether the template is a region adjacent to the slice or tile boundary. Further, whether the template is available may be determined based on whether the template is a decoded region based on the intra mode.

When the cost for the MVP candidate is derived based on the template as described above, the cost of the MVP candidate may very depending on the location of the neighboring block. Therefore, the present disclosure proposes a method for preventing a case where there is a large cost difference depending on the location and more improving a cost derivation method as follows.

For example, the cost for the left template of the motion vector of the left neighboring block may be derived to be smaller than the cost for the left template of another MVP candidate. Specifically, the cost for the left template of the motion vector of the left neighboring block may be derived as an SAD of the left template of the reference block indicated by the motion vector of the left neighboring block and the left template of the current block. Accordingly, since the left template is the left neighboring region of the current block, the left template may represent a reconstruction block of the left neighboring block, since the reference block is a reference block derived based on the motion vector of the left neighboring block, the cost for the left template of the motion vector of the left neighboring block may mean a distortion between the reconstruction block and the reference block, and the cost for the left template of the motion vector of the left neighboring block may be derived to be smaller than the cost for the left template of another MVP candidate.

Further, the cost for the top template of the motion vector of the top neighboring block may be derived to be smaller than the cost for the top template of another MVP candidate. Specifically, the cost for the top template of the motion vector of the top neighboring block may be derived as an SAD of the top template of the reference block indicated by the motion vector of the top neighboring block and the top template of the current block. Accordingly, since the top template is the top neighboring region of the current block, the top template may represent the reconstruction block of the top neighboring block, since the reference block is the reference block derived based on the motion vector of the top neighboring block, the cost for the top template of the motion vector of the top neighboring block may mean the distortion between the reconstruction block and the reference block, and the cost for the top template of the motion vector of the top neighboring block may be derived to be smaller than the cost for the top template of another MVP candidate.

A phenomenon in which the cost varies depending on the location and the size of the template may be further exacerbated when the current block is a non-square block.

In order to improve the phenomenon, a method for reducing an influence depending on the template size by normalizing the cost of each of the left template and the top template may be proposed.

For example, when the size of the current block is width×height and the template size is 2, the size of the left template may be (2×height) and the size of the top template may be (width×2). In this case, the cost of the left template and the cost of the top template which are normalized may be derived based on the following equation.

$$costL' = costL \gg \log 2(2 \times height)$$

$$costA' = costA \gg \log 2(width \times 2) \qquad \text{[Equation 5]}$$

Here, costL' represents the normalized cost of the left template, costA' represents the normalized cost of the top template, costL represents the cost of the left template, costA represents the cost of the top template, width represents the width of the current block, and height represents the height of the current block.

Meanwhile, the size of the template may be preset to 2. Alternatively, the size of the template may be changed as in embodiments to be described below.

As an example, the size of the template may be derived based on the size of the current block. For example, when the size of the current block is smaller than a size of 16×16, the size of the template may be derived as 2 and when the size of the current block is equal to or larger than the size of 16×16, the size of the template may be derived as 4.

When the size of the template is derived, the template for the MVP candidate may include a top-left sample of (−n, 0), include a left neighboring region (left template) having a size of n×H and a top-left sample of (0, −n), and include a top neighboring region (top template) having a size of W×n. Here, n represents the size of the template.

Meanwhile, in embodiments of deriving the MVP candidate list and deriving the MVP of the current block based on the MVP candidate list, only a template of a luma block of the current block may be considered. However, the derived MVP may be used for motion compensation of a chroma component in addition to the luma component of the current block, and as a result, when deriving the MVP by using the cost derived based on Equation 5 described above, the MVP may not be accurate with respect to derivation of the motion vectors of the luma component and the chroma component of the current block. Therefore, the present disclosure proposes a method for deriving the cost for the MVP candidate proposed as described below.

For example, when the size of the luma block of the current block is $W_L \times H_L$, the size of the chroma block of the current block is $W_C \times H_C$, and the template size is 2, modified cost of the left template of the current block and modified cost of the top template of the current block may be derived based on the following equation.

$$costA(LX)(w*costA(LX,L) \gg \log 2(W_L \times 2)) + ((1-w) \\ *costA(LX,C) \gg \log 2(W_C))$$

$$costL(LX) = (w*costL(LX,L) \gg \log 2(2 \times H_L)) + ((1-w) \\ *costL(LX,C) \gg \log 2(H_C)) \qquad \text{[Equation 6]}$$

Here, costA(LX) represents the modified costs for the top template of the luma block and the top template of the chroma block of the current block, costL(LX) represents the modified costs for the left template of the luma block and the left template of the chroma block of the current block, costA(LX, L) represents the cost of the top template of the luma block of the current block, costL(LX, L) represents the cost of the left template of the luma block of the current block, costA(LX, C) represents the cost of the top template of the chroma block of the current block, and costL(LX, C) represents the cost of the left template of the chroma block of the current block. Further, $W_L$ represents the width of the luma block of the current block, $H_L$ represents the height of the luma block of the current block, $W_C$ represents the width of the chroma block of the current block, and $H_C$ represents the height of the chroma block of the current block. Further, w represents a weighting factor. The weighting factor for the luma block may be set to be larger than the weighting factor for the chroma block. In other words, w may be set to be larger than (1−w), so that the w may be set to a value larger than 0.5. Further, the weighting factor may be derived based on the current block. In other words, the weighting factor may be set in units of blocks. Alternatively, the weighting factor may be preset in units of slices and the cost for the MVP candidate may be derived based on the weighting factor. Meanwhile, as an example, line buffers for the luma block and the chroma block may be defined as 2 and 1, respectively. The line buffers for the luma block and the chroma block may be defined as different values and a value normalized based on the sizes of the luma block and the chroma block may be used.

Meanwhile, when a location illumination compensation (LIC) is applied to the current block, an illumination compensation_SAD (IC_SAD) is derived, and as a result, the method for calculating the cost for the MVP candidate may be changed. The IC_SAD may be derived based on the following equation.

$$IC\_SAD = \Sigma|Cur - Ref - iDelta| \qquad \text{[Equation 7]}$$

$$iDelta = (\Sigma|Cur| - \Sigma|Ref|)/W \times H \qquad \text{[Equation 8]}$$

Here, Cur represents the sample value in the template of the current block, Ref represents the sample value in the template of the reference block, W represents the width of the current block, and H represents the height of the current block.

Meanwhile, a detailed description of the LIC may be as follows.

When there is a light source or a shadow in the image, a local illumination change occurs in the affected region. In this case, in performing a prediction for an object in the block, performance of the prediction is reduced due to a difference in illumination between the current block of the current picture and the reference block of the reference picture. The reason is that the local illumination change is not compensated according to a general motion estimation/compensation algorithm used during the video encoding/decoding process. On the contrary, when the location illumination change is compensated, a more accurate prediction may be performed.

Specifically, efficiency of the prediction may be increased by predicting the current block based on the reference block compensated by applying the illumination compensation and in this case, a residual between a predicted current block and an original block is reduced, and as a result, data allocated to a residual signal may be reduced and the coding efficiency may be enhanced. A method for increasing the efficiency of the prediction by compensating the illumination for the reference block may be referred to as a location illumination compensation (LIC). The LIC may be mixedly used with an illumination compensation (IC). The IC_SAD may represent a value for the illumination compensation. In other words, when the LIC is applied to the current block, the compensated reference block may be derived based on the IC_SAD. For example, a reference sample value of the compensated reference block may be derived as a value acquired by adding the IC_SAD to the reference sample value of the reference block.

Meanwhile, an LIC flag for representing whether to apply the LIC may be used as additional information for the LIC. For example, when the value of the LIC flag is 1 (i.e., when the value of the LIC flag is 'true'), the LIC flag may represent that the LIC is applied to the current block and when the value of the LIC flag is 0 (i.e., when the value of the LIC flag is 'false'), the LIC flag may represent that the LIC is not applied to the current block.

In order to increase the efficiency of the LIC, it is important to increase the prediction performance while minimizing additional information for the LIC. For example, whether to apply the LIC may be determined by considering a block size or a partition type such as restrictively applying the LIC to a CU having a specific size or a PU having a partition type of 2N×2N in order to minimize the additional information. Further, when a QTBT structure is used as described above, CUs having various sizes may be used without distinguishing the CU, the PU, and the TU, and as a result, the accuracy of the prediction may be increased by applying the LIC to be suitable for the corresponding structure.

Meanwhile, since the IC_SAD is derived based on the template of the current block and the template of the reference block indicated by the MVP candidate, the IC_SAD may be used as the cost for the MVP candidate. For example, when the value of the LIC flag is 'true', i.e., when the LIC flag represents that the LIC is applied to the current block, the cost of the MVP candidate for the luma block of the current block may be derived as the IC_SAD and the cost of the MVP candidate for the chroma block of the current block may be derived as an SAD of the template of the chroma block of the current block and the template of the chroma block of the reference block. Further, when the value of the LIC flag is 'false', i.e., when the LIC flag represents that the LIC is not applied to the current block, the cost of the MVP candidate for the luma block of the current block may be derived as an SAD of the template of the luma block of the current block and the template of the luma block of the reference block and the cost of the MVP candidate for the chroma block of the current block may be derived as an SAD of the template of the chroma block of the current block and the template of the chroma block of the reference block. In the embodiment as an example, a method for using the IC_SAD may be variously changed according to whether the chroma block is considered. For example, the weighting factor may be derived based on the value of the LIC flag.

Meanwhile, in order to reduce complexity, a method for deriving the cost by considering both the luma block and the chroma block may be applied to the reordering process, but not applied to the refinement process. In other words, a method for deriving the cost of the MVP candidate for the luma block of the current block and deriving the cost of the MVP candidate for the chroma block of the current block may be applied to the reordering process and the refinement process may be performed based on the cost of the MVP candidate for the current block. The cost of the MVP candidate for the current block may be represented as the cost of the MVP candidate for the luma block. Further, the opposite case may be possible. Further, the method may also be used for cost by decoder side motion vector refinement (DMVR) or cost by bi-lateral matching.

Meanwhile, in the refinement process for the MVP candidate list, a memory for a wide region should be accessed. In other words, in order to perform the refinement process, a lot of hardware resources may be required. Therefore, the present disclosure proposes a refinement process performed based on a restricted access for the reference picture.

Figure 11:
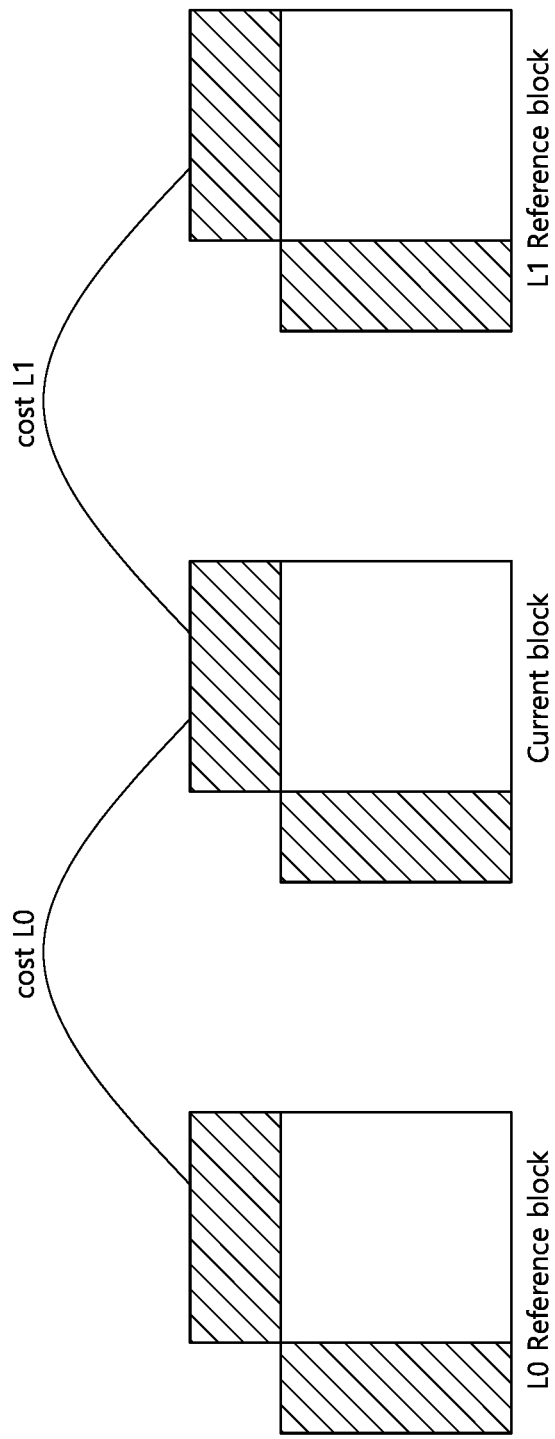
FIG. 11 illustrates an example of deriving cost L0 for the current block and an L0 reference block and cost L1 for the current block and an L1 reference block.

FIG. 11 illustrates an example of deriving cost L0 for the current block and an L0 reference block and cost L1 for the current block and an L1 reference block.

Referring to FIG. 11, the cost L0 for the current block and the L0 reference block may be derived as a sum of absolute difference (SAD) of the template of the current block and the template of the L0 reference block. In other words, the cost may be derived as a sum of absolute difference (SAD) between samples corresponding to the template of the current block and the template of the L0 reference block. The L0 reference block may be a reference block indicated by the MVP candidate representing the L0 motion vector.

Here, the template of the current block may include a top template and a left template and the cost L0 may be derived as a sum of a top cost L0 and a left cost L0. The top cost L0 may be derived as an SAD of the top template of the current block and the top template of the L0 reference block and the left cost L0 may be derived as an SAD of the left template of the current block and the left template of the L0 reference block.

Further, referring to FIG. 11, the cost L1 for the current block and the L1 reference block may be derived as a sum of absolute difference (SAD) of the template of the current block and the template of the L1 reference block. In other words, the cost may be derived as a sum of absolute difference (SAD) between samples corresponding to the template of the current block and the template of the L1 reference block. The L1 reference block may be a reference block indicated by the MVP candidate representing the L1 motion vector.

Here, the template of the current block may include a top template and a left template and the cost L1 may be derived as a sum of a top cost L1 and a left cost L1. The top cost L1 may be derived as an SAD of the top template of the current block and the top template of the L1 reference block and the left cost L1 may be derived as an SAD of the left template of the current block and the left template of the L0 reference block.

When the cost L0 and the cost L1 are derived, a restricted refinement process may be performed based on the cost L0 and the cost L1 as follows.

Figure 12:
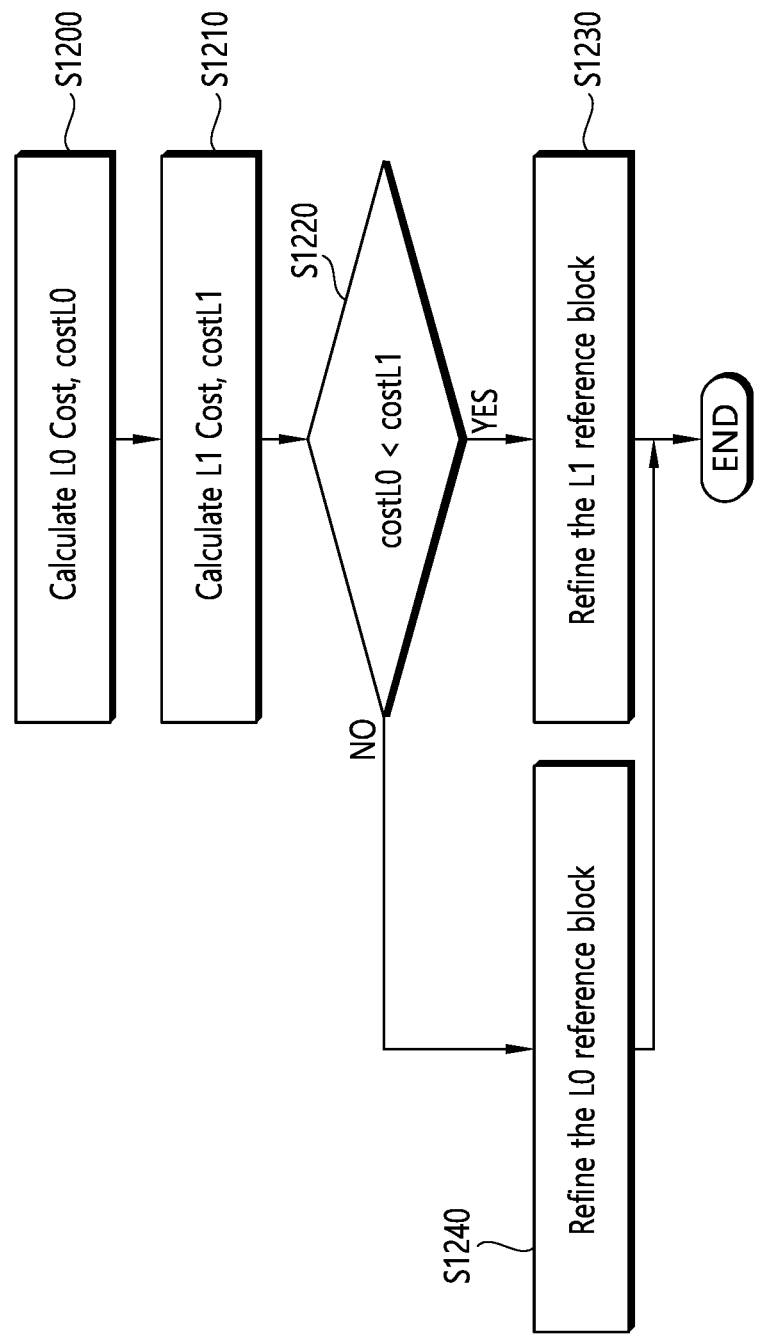
FIG. 12 illustrates an example of a restricted refinement performed based on the cost L0 and the cost L1.

FIG. 12 illustrates an example of a restricted refinement performed based on the cost L0 and the cost L1. Referring to FIG. 12, the encoding apparatus/decoding apparatus derives the cost L0 for the current block and the L0 reference block (S1200). The cost L0 for the current block and the L0 reference block may be derived as a sum of absolute difference (SAD) of the template of the current block and the template of the L0 reference block. In other words, the cost may be derived as a sum of absolute difference (SAD) between samples corresponding to the template of the current block and the template of the L0 reference block. The L0 reference block may be a reference block indicated by the MVP candidate representing the L0 motion vector.

The encoding apparatus/decoding apparatus derives the cost L1 for the current block and the L1 reference block (S1210). The cost L1 for the current block and the L1 reference block may be derived as a sum of absolute difference (SAD) of the template of the current block and the template of the L1 reference block. In other words, the cost may be derived as a sum of absolute difference (SAD) between samples corresponding to the template of the current block and the template of the L1 reference block. The L1 reference block may be a reference block indicated by the MVP candidate representing the L1 motion vector.

The encoding apparatus/decoding apparatus may determine whether the cost L1 is larger than the cost L0 (S1220).

When the cost L1 is larger than the cost L0, the encoding apparatus/decoding apparatus may derive a refine MVP candidate for the MVP candidate representing the L1 motion vector (S1230). For example, the encoding apparatus/decoding apparatus may derive a template having small cost with the template of the current block among templates of reference blocks included in a predetermined neighboring region of the L1 reference block indicated by the MVP candidate representing the L1 motion vector. The encoding apparatus/decoding apparatus may derive a motion vector indicating the reference block of the derived template as a refine motion vector. In other words, the encoding apparatus/decoding apparatus may derive the refine motion vector indicating the reference block of the derived template as the refine MVP candidate.

When the cost L1 is not larger than the cost L0, the encoding apparatus/decoding apparatus may derive a refine MVP candidate for the MVP candidate representing the L0 motion vector (S1240). For example, the encoding apparatus/decoding apparatus may derive a template having small cost with the template of the current block among templates of reference blocks included in a predetermined neighboring region of the L0 reference block indicated by the MVP candidate representing the L0 motion vector. The encoding apparatus/decoding apparatus may derive a motion vector indicating the reference block of the derived template as a refine motion vector. In other words, the encoding apparatus/decoding apparatus may derive the refine motion vector indicating the reference block of the derived template as the refine MVP candidate.

Referring to FIG. 12, only the reference picture for one prediction of the L0 prediction and the L1 prediction may be used for the refinement process to thereby reducing a memory access for the refinement process. Here, the L0 prediction may represent an inter prediction performed based on the reference picture included in the reference picture list L0 and the L1 prediction may represent an inter prediction performed based on the reference picture included in the reference picture list L1. Further, the refinement process for one predetermined specific reference picture list may be performed without a separate condition. Meanwhile, the restricted refinement process may also be applied to the DMVR and may be effective for reducing the memory access for the DMVR.

Figure 13:
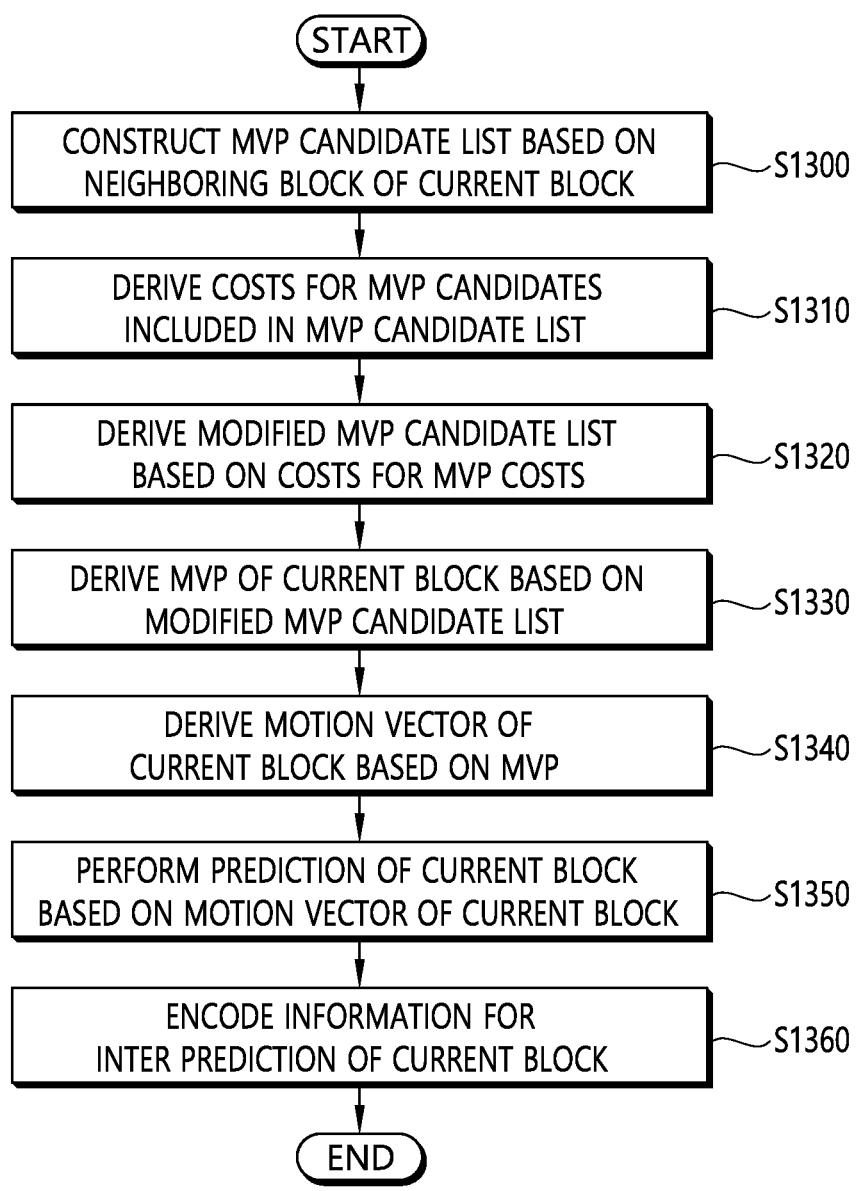
FIG. 13 schematically illustrates a video encoding method by an encoding apparatus according to the present disclosure.

FIG. 13 schematically illustrates a video encoding method by an encoding apparatus according to the present disclosure. The method disclosed in FIG. 13 may be performed by the encoding apparatus disclosed in FIG. 1. Specifically, for example, S1300 to S1350 of FIG. 13 may be performed by the predictor of the encoding apparatus and S1360 may be performed by the entropy encoder of the encoding apparatus.

The encoding apparatus constructs the MVP candidate list based on the neighboring block of the current block (S1300). Here, the neighboring block may include the left neighboring block, the top neighboring block, the top-right neighboring block, the bottom-left neighboring block, and the top-left neighboring block of the current block. Further, the neighboring block may include a co-located block including a location in the reference picture corresponding to a bottom-right location or a center location of the current block. When the size of the current block is W×H and an x component of a top-left sample position of the current block is 0 and a y component is 0, the left neighboring block may be a block including a top-left sample of coordinate (−1, H−1), the top neighboring block may be a block including a top-left sample of coordinate (W−1, −1), the top-right neighboring block may be a block including a top-left sample of coordinate (W, −1), the bottom-left neighboring block may be a block including a top-left sample of coordinate (−1, H), and the top-left neighboring block may be a block including a top-left sample of coordinate (−1, −1).

For example, the encoding apparatus may determine availability in the order of the motion vector of the left neighboring block of the current block, the motion vector of the top neighboring block, the motion vector of the top-right neighboring block, the motion vector of the bottom-left neighboring block, and the motion vector of the top-left neighboring block and sequentially add the available motion vector to the MVP candidate list as the MVP candidate.

The availability for the motion vector of the neighboring block may be determined as follows. Specifically, it may be sequentially determined whether the motion vector of the neighboring block corresponds to a first motion vector or a second motion vector and when the motion vector of the neighboring block is not the first motion vector and the second motion vector, it may be determined that the motion vector of the neighboring block is not available. Here, the first motion vector may be a motion vector for a specific reference picture included in a specific reference picture list and the second motion vector may be a motion vector for the specific reference picture included in a reference picture list other than the specific reference picture list. The specific reference picture included in the specific reference picture list may be a reference picture of the current block. Meanwhile, when it is determined that the motion vector of the neighboring block is not available, the motion vector may be scaled and the scaled motion vector may be added to the MVP candidate list as the MVP candidate.

Further, the encoding apparatus may construct an MVP candidate list including a maximum number of MVP candidates based on the neighboring block. For example, the maximum number of MVP candidates included in the MVP candidate list may be 5.

When the number of MVP candidates derived based on the neighboring block is smaller than the maximum number, the encoding apparatus may construct the MVP candidate list including the maximum number of MVP candidates based on the scaled motion vector of the left neighboring block of the current block, the scaled motion vector of the top neighboring block, the scaled motion vector of the top-right neighboring block, the scaled motion vector of the bottom-left neighboring block, and the scaled motion vector of the top-left neighboring block. The MVP candidates may be sequentially added to the MVP candidate list in the order of the scaled motion vector of the left neighboring block, the scaled motion vector of the top neighboring block, the scaled motion vector of the top-right neighboring block, the scaled motion vector of the bottom-left neighboring block, and the scaled motion vector of the top-left neighboring block so as to construct the maximum number of MVP candidates.

Meanwhile, the encoding apparatus may determine whether any one mode of the skip mode, the merge mode, and the adaptive motion vector prediction (AMVP) mode is applied to the current block and generate prediction mode information of the current block. The prediction mode information may indicate whether any one mode of the skip mode, the merge mode, and the adaptive motion vector prediction (AMVP) mode is applied to the current block. Further, information on the inter prediction of the current block may include the prediction mode information.

The encoding apparatus derives costs for MVP candidates included in the MVP candidate list (S1310). The encoding apparatus may derive the costs for the MVP candidates.

For example, the cost of the MVP candidate may be derived as a sum of absolute difference (SAD) of the template of the current block and the template of the reference block of the MVP candidate. The reference block may represent the reference block indicated by the MVP candidate. In other words, the cost may be derived as a sum of absolute difference (SAD) between samples corresponding to the template of the current block and the template of the reference block for the MVP candidate. The cost may be derived based on Equation 1 described above.

Here, the template of the current block may include a top template and a left template and the cost may be derived as a sum of a top cost and a left cost. The top cost may be derived as an SAD of the top template of the current block and the top template of the reference block for the MVP candidate and the left cost may be derived as an SAD of the left template of the current block and the left template of the reference block for the MVP candidate. Meanwhile, when the size of the current block is W×H and when the x component of the top-left sample position of the current block is 0 and the y component is 0, the template of the current block may include a top-left sample of coordinate (−n, 0) and include the left template having a size of n×H and a top-left sample of (0, −n), and may be derived as the top template having a size of W×n. Here, the n may represent a value indicated by size information for the template. The encoding apparatus may determine the size for the template and generate the size information for the template. The information on the inter prediction may include the size information for the template.

Alternatively, the top cost may be derived as a value acquired by normalizing the SAD of the top template of the current block and the top template of the reference block for the MVP candidate with the size of the top template and the left cost may be derived as a value acquired by normalizing the SAD of the left template of the current block and the left template of the reference block for the MVP candidate with the size of the left template. The left cost and the top cost may be derived based on Equation 5 described above.

Further, as another example, the cost of the MVP candidate may be derived as the sum of the top cost of the MVP candidate and the left cost of the MVP candidate, the top cost of the MVP candidate may be derived based on a top luma cost of the MVP candidate and a top chroma cost of the MVP candidate, and the left cost of the MVP candidate may be derived as the left luma cost of the MVP candidate and the left chroma cost of the MVP candidate.

The top luma cost of the MVP candidate may be derived as a sum of absolute difference (SAD) of the top template of the luma block of the current block and the top template of the chroma block of the reference block for the MVP candidate and the top chroma cost of the MVP candidate may be derived as an SAD of the top template of the chroma block of the current block and the top template of the chroma block of the reference block for the MVP candidate. Specifically, the top cost of the MVP candidate may be derived based on the following equation.

$$costA(LX) = (w * costA(LX,L) >> \log 2(W_L \times 2)) + ((1-w) * costA(LX,C) >> \log 2(W_C)) \quad \text{[Equation 9]}$$

Here, costA(LX) may represent the top cost of the MVP candidate, costA(LX, L) may represent the top cost of the luma block of the current block, costA(LX, C) may represent the top cost of the chroma block of the current block, $W_L$ may represent the width of the luma block of the current block, $W_C$ may represent the width of the chroma block of the current block, and w may represent the weighting factor. Meanwhile, for example, the weighting factor may be set to a value which is 0.5 or more and 1 or less.

Further, the left luma cost of the MVP candidate may be derived as a sum of absolute difference (SAD) of the left template of the luma block of the current block and the left template of the chroma block of the reference block for the MVP candidate and the left chroma cost of the MVP candidate may be derived as an SAD of the left template of the chroma block of the current block and the left template of the chroma block of the reference block for the MVP candidate. Specifically, the left cost of the MVP candidate may be derived based on the following equation.

$$costL(LX) = (w * costL(LX,L) >> \log 2(2 \times H_L)) + ((1-w) * costL(LX,C) >> \log 2(H_C)) \quad \text{[Equation 10]}$$

Here, costL(LX) may represent the left cost of the MVP candidate, costL(LX, L) may represent the left cost of the luma block of the current block, costL(LX, C) may represent the left cost of the chroma block of the current block, $H_L$ may represent the height of the luma block of the current block, $H_C$ may represent the height of the chroma block of the current block, and w may represent the weighting factor. Meanwhile, for example, the weighting factor may be set to the value which is 0.5 or more and 1 or less.

Further, when a location illumination compensation (LIC) is applied to the current block, the luma cost may be derived as IC_SAD. When the LIC is not applied to the current block, the luma cost may be derived based on Equation 1 described above.

Here, the IC_SAD may be derived based on the following equation.

$$IC\_SAD = \Sigma|Cur-Ref-iDelta|$$

$$iDelta = (\Sigma|Cur|-\Sigma|Ref|)/W \times H \quad \text{[Equation 11]}$$

Here, Cur may represent a reconstruction sample included in the template of the luma block of the current block, Ref may represent the reconstruction sample included in the template of the luma block of the reference block for the MVP candidate, W may represent the width of the luma block of the current block, and H may represent the height of the luma block of the current block. Meanwhile, the chroma cost may be derived as the IC_SAD. Alternatively, the chroma cost may be derived as a different value from the luma cost. The chroma cost may be derived based on Equation 1 described above. Meanwhile, the encoding apparatus may generate an LIC flag indicating whether to apply the LIC of the current block. For example, when the value of the LIC flag is 1, the LIC flag may indicate that the LIC is applied to the current block and when the value of the LIC flag is 0, the LIC flag may indicate that the LIC is not applied to the current block.

The encoding apparatus derives a modified MVP candidate list based on the costs for the MVP candidates (S1320).

For example, the encoding apparatus may derive a reordered MVP candidate list by reordering the MVP candidates in the order of small cost, derive a refine MVP candidate based on a specific MVP candidate among the MVP candidates, and derive the modified MVP candidate list by adding the refine MVP candidate to the reordered MVP candidate list.

Alternatively, the encoding apparatus may derive the modified MVP candidate list by reordering the MVP candidates in the order of small cost. Alternatively, the encoding apparatus may derive the refine MVP candidate based on a specific MVP candidate among the MVP candidates of the MVP candidate list and derive the modified MVP candidate list by adding the refine MVP candidate to the MVP candidate list.

Meanwhile, the cost for the MVP candidate may include a luma cost and a chroma cost and the luma cost and the chroma cost may be derived as different values. In this case, the modified MVP candidate list for the luma block of the current block may be derived based on the luma cost and the modified MVP candidate list for the chroma block of the current block may be derived based on the chroma cost.

Specifically, the encoding apparatus may derive the reordered MVP candidate list by reordering the MVP candidates included in the MVP candidate list for the luma block of the current block in the order of small luma cost, derive the refine MVP candidate based on a specific MVP candidate among the MVP candidates, and derive the modified MVP candidate list for the luma block by adding the refine MVP candidate to the reordered MVP candidate list. Further, the encoding apparatus may derive the reordered MVP candidate list by reordering the MVP candidates included in the MVP candidate list for the chroma block of the current block in the order of small chroma cost, derive the refine MVP candidate based on a specific MVP candidate among the MVP candidates, and derive the modified MVP candidate list for the chroma block by adding the refine MVP candidate to the reordered MVP candidate list.

Meanwhile, the MVP candidates may be derived as the specific MVP candidate in the reordering order. Alternatively, a MVP candidate having a smallest cost among the MVP candidates may be derived as the specific MVP candidate.

Specifically, the refine MVP candidate may be derived as follows.

As an example, the encoding apparatus may derive a template having a smallest cost with the template of the current block among the templates of the reference blocks in a search range and derive a motion vector indicating the reference block of the derived template as the refine MVP candidate. Here, the search range may be 1 integer pel range around a position indicated by the specific MVP candidate. Alternatively, the search range may be 2 integer pel range around the position indicated by the specific MVP candidate. Alternatively, the search range may be half integer pel range around the position indicated by the specific MVP candidate. Further, the search range may be set to a range other than the examples.

The encoding apparatus may derive the modified MVP candidate list by adding the refine MVP candidate to the reordered MVP candidate list. For example, the refine MVP candidate may be added to the modified MVP candidate list in an order that precedes the specific MVP candidate. Meanwhile, when the refine MVP candidate is added to the modified MVP candidate list, the MVP candidates of the modified MVP candidate list may be reordered. For example, when the refine MVP candidate is a first-order MVP candidate of the modified MVP candidate list, MVP candidates other than the refine MVP candidate may be reordered in the order of the MVP candidate list.

Meanwhile, the encoding apparatus may determine that the MVP candidate of the modified MVP candidate list represents the same motion vector as an MVP candidate in the previous order. When the MVP candidate represents the same motion vector as the MVP candidate in the previous order, the MVP candidate may be removed from the modified MVP candidate list. The encoding apparatus may determine whether all MVP candidates of the modified MVP candidate list represent the same motion vector as the MVP candidate in the previous order. Alternatively, the encoding apparatus may determine that the refine MVP candidate represents the same motion vector as the MVP candidate in the previous order. Alternatively, the encoding apparatus may determine that the reordered MVP candidate represents the same motion vector as the MVP candidate in the previous order. Here, the reordered MVP candidate may be an MVP candidate in which the order in the MVP candidate list and the order in the reordered MVP candidate list are different.

The encoding apparatus derives the MVP of the current block based on the modified MVP candidate list (S1330). The encoding apparatus may select one MVP candidate of the MVP candidates of the modified MVP candidate list and derive the motion vector represented by the selected MVP candidate as the MVP of the current block. The encoding apparatus may generate an MVP index indicating the selected MVP candidate among the MVP candidates included in the modified MVP candidate list. The information on the inter prediction may include the MVP index.

The encoding apparatus derives the motion vector of the current block based on the MVP of the current block (S1340). The encoding apparatus may derive the motion vector of the current block and generate a motion vector difference (MVD) of the current block based on the MVP. The information on the inter prediction may include the MVD. The encoding apparatus may derive the motion vector of the current block through addition of the MVP and the MVD.

The encoding apparatus performs a prediction of the current block based on the motion vector of the current block (S1350). A prediction block of the current block may be derived based on the motion vector and the reconstruction block may be derived based on the prediction block. Specifically, the encoding apparatus may derive the reference block in the reference picture of the current block based on the motion vector. The encoding apparatus may derive a specific reference picture included in a specific reference picture list as the reference picture of the current block and derive a block indicated by the motion vector in the reference picture as the reference block of the current block. The encoding apparatus may generate the prediction sample based on the reference block. The encoding apparatus may generate a reference picture index indicating the reference picture of the current block. The information on the inter prediction of the current block may include the reference picture index.

Further, the encoding apparatus may generate a residual sample based on the original sample and the generated prediction sample. The encoding apparatus may generate information on the residual based on the residual sample. The information on the residual may include transform coefficients relating to the residual sample. The encoding apparatus may generate the reconstruction sample based on the prediction sample and the residual sample. In other words, the encoding apparatus may derive the reconstruction sample by adding the prediction sample and the residual sample. Further, the encoding apparatus may encode the information on the residual and output the encoded residual information in the form of bitstream. The bitstream may be transmitted to the decoding apparatus via a network or a storage medium.

The encoding apparatus encodes information on the inter prediction of the current block (S1360). When the AMVP mode is applied to the current block, the encoding apparatus may generate an MVP index indicating the selected MVP candidate in order to derive the MVP of the current block. The encoding apparatus may encode and output the MVP index. The information on the inter prediction may include the MVP index. Further, the encoding apparatus may generate a reference picture index of the current block and the information on the inter prediction may include the reference picture index. Further, the encoding apparatus may generate the MVD of the current block and the information on the inter prediction may include the MVD. The information on the inter prediction may include the reference picture index. Further, the encoding apparatus may generate the LIC flag of the current block and the information on the inter prediction may include the LIC flag.

Further, the encoding apparatus may generate the information on the residual based on the residual sample. The information on the residual may include transform coefficients relating to the residual sample. The encoding apparatus may encode the information on the residual and output the encoded residual information in the form of bitstream. The bitstream may be transmitted to the decoding apparatus via a network or a storage medium.

Figure 14:
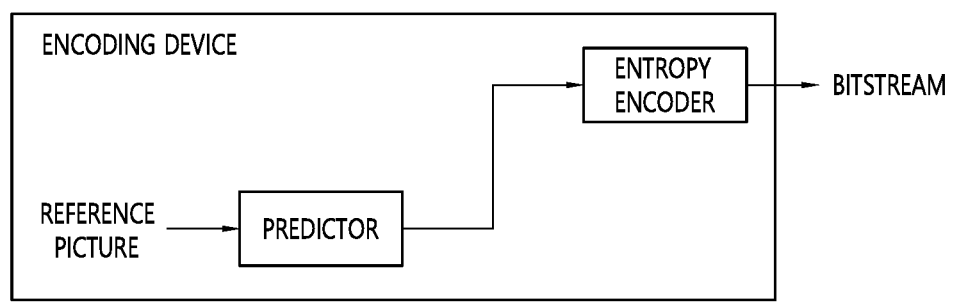
FIG. 14 schematically illustrates an encoding apparatus performing a video encoding method according to the present disclosure.

FIG. 14 schematically illustrates an encoding apparatus performing a video encoding method according to the present disclosure. The method disclosed in FIG. 13 may be performed by the encoding apparatus disclosed in FIG. 14. Specifically, for example, the predictor of the encoding apparatus of FIG. 14 may perform S1300 to S1350 of FIG. 13 and the entropy encoder of the encoding apparatus of FIG. 14 may perform S1360 of FIG. 13.

Figure 15:
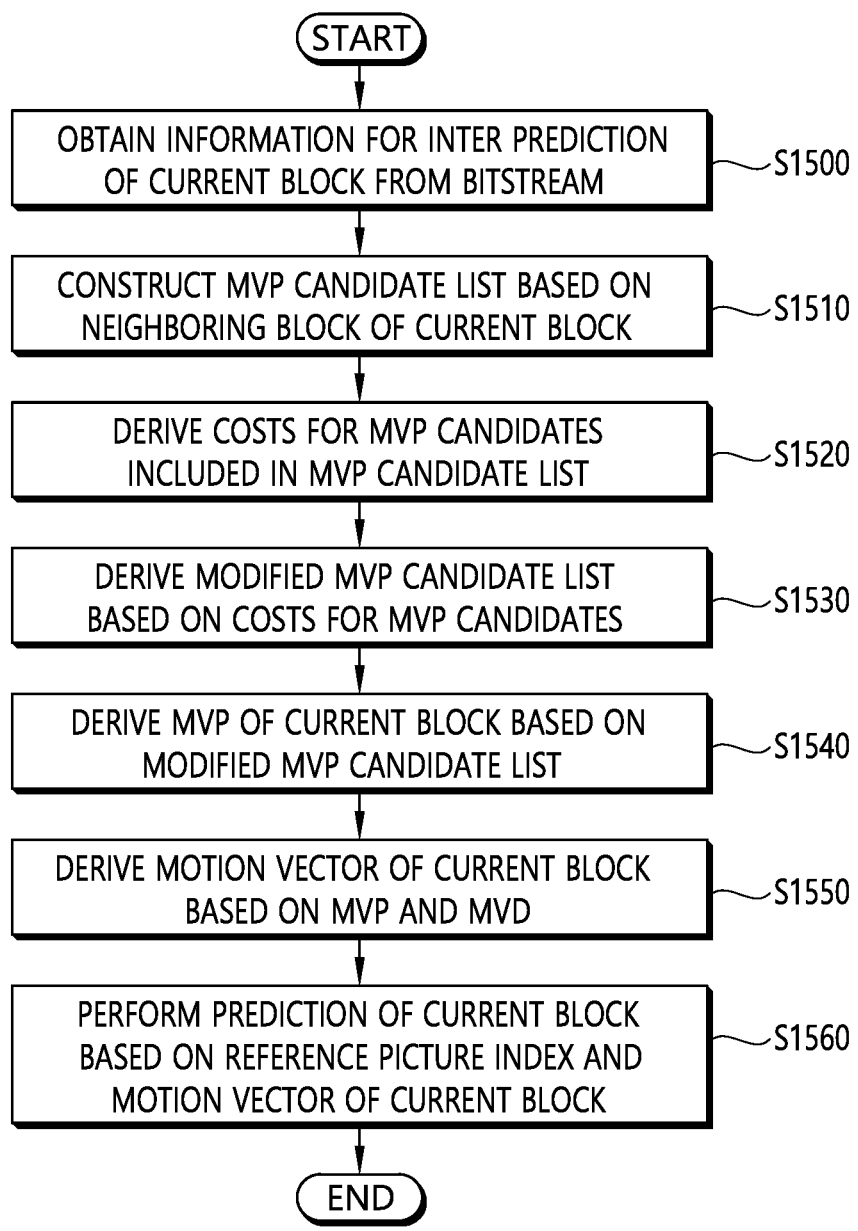
FIG. 15 schematically illustrates a video decoding method by a decoding apparatus according to the present disclosure.

FIG. 15 schematically illustrates a video decoding method by a decoding apparatus according to the present disclosure. The method disclosed in FIG. 15 may be performed by the decoding apparatus disclosed in FIG. 2. Specifically, for example, S1500 of FIG. 15 may be performed by the entropy decoder of the decoding apparatus and S1510 to S1560 may be performed by the predictor of the decoding apparatus.

The decoding apparatus acquires information on the inter prediction of the current block from the bitstream (S1500). The decoding apparatus may acquire the information on the inter prediction of the current block from the bitstream. The information on the inter prediction may include prediction mode information indicating whether any one mode of the skip mode, the merge mode, and the adaptive motion vector prediction (AMVP) mode is applied to the current block. When the AMVP mode is applied to the current block, the decoding apparatus may construct a motion vector predictor (MVP) candidate list based on the neighboring block of the current block and acquire an MVP index (merge index) indicating one MVP candidate among the MVP candidates included in the MVP candidate list. The information on the inter prediction may include the MVP index. Further, the information on the inter prediction may include a motion vector difference (MVD). Further, the information on the inter prediction may include a reference picture index of the current block. The reference picture index may indicate a specific reference picture included in a specific reference picture list and the specific reference picture may be derived as a reference picture of the current block. Here, the specific reference picture list may be a reference picture list L0 (List 0) or a reference picture list L1 (List 1).

The decoding apparatus constructs the MVP candidate list based on the neighboring block of the current block (S1510). Here, the neighboring block may include the left neighboring block, the top neighboring block, the top-right neighboring block, the bottom-left neighboring block, and the top-left neighboring block of the current block. Further, the neighboring block may include a co-located block including a location in the reference picture corresponding to a bottom-right location or a center location of the current block. When the size of the current block is W×H and an x component of a top-left sample position of the current block is 0 and a y component is 0, the left neighboring block may be a block including a top-left sample of coordinate (−1, H−1), the top neighboring block may be a block including a top-left sample of coordinate (W−1, −1), the top-right neighboring block may be a block including a top-left sample of coordinate (W, −1), the bottom-left neighboring block may be a block including a top-left sample of coordinate (−1, H), and the top-left neighboring block may be a block including a top-left sample of coordinate (−1, −1).

For example, the decoding apparatus may determine availability in the order of the motion vector of the left neighboring block of the current block, the motion vector of the top neighboring block, the motion vector of the top-right neighboring block, the motion vector of the bottom-left neighboring block, and the motion vector of the top-left neighboring block and sequentially add the available motion vector to the MVP candidate list as the MVP candidate.

The availability for the motion vector of the neighboring block may be determined as follows. Specifically, it may be sequentially determined whether the motion vector of the neighboring block corresponds to a first motion vector or a second motion vector and when the motion vector of the neighboring block is not the first motion vector and the second motion vector, it may be determined that the motion vector of the neighboring block is not available. Here, the first motion vector may be a motion vector for the specific reference picture included in the specific reference picture list and the second motion vector may be a motion vector for the specific reference picture included in a reference picture list other than the specific reference picture list. Meanwhile, when it is determined that the motion vector of the neighboring block is not available, the motion vector may be scaled and the scaled motion vector may be added to the MVP candidate list as the MVP candidate.

Further, the decoding apparatus may construct an MVP candidate list including a maximum number of MVP candidates based on the neighboring block. For example, the maximum number of MVP candidates included in the MVP candidate list may be 5.

When the number of MVP candidates derived based on the neighboring block is smaller than the maximum number, the decoding apparatus may construct the MVP candidate list including the maximum number of MVP candidates based on the scaled motion vector of the left neighboring block of the current block, the scaled motion vector of the top neighboring block, the scaled motion vector of the top-right neighboring block, the scaled motion vector of the bottom-left neighboring block, and the scaled motion vector of the top-left neighboring block. The MVP candidates may be sequentially added to the MVP candidate list in the order of the scaled motion vector of the left neighboring block, the scaled motion vector of the top neighboring block, the scaled motion vector of the top-right neighboring block, the scaled motion vector of the bottom-left neighboring block, and the scaled motion vector of the top-left neighboring block so as to construct the maximum number of MVP candidates.

The decoding apparatus derives costs for MVP candidates included in the MVP candidate list (S1520). The decoding apparatus may derive the costs for the MVP candidates.

For example, the cost of the MVP candidate may be derived as a sum of absolute difference (SAD) of the template of the current block and the template of the reference block of the MVP candidate. The reference block may represent the reference block indicated by the MVP candidate. In other words, the cost may be derived as a sum of absolute difference (SAD) between samples corresponding to the template of the current block and the template of the reference block for the MVP candidate. The cost may be derived based on Equation 1 described above.

Here, the template of the current block may include a top template and a left template and the cost may be derived as a sum of a top cost and a left cost. The top cost may be derived as an SAD of the top template of the current block and the top template of the reference block for the MVP candidate and the left cost may be derived as an SAD of the left template of the current block and the left template of the reference block for the MVP candidate. Meanwhile, when the size of the current block is W×H and when the x component of the top-left sample position of the current block is 0 and the y component is 0, the template of the current block may include a top-left sample of coordinate (−n, 0) and include the left template having a size of n×H and a top-left sample of (0, −n), and may be derived as the top template having a size of W×n. Here, the n may represent a value indicated by size information for the template. The decoding apparatus may acquire the size information for the template through the bitstream. For example, the information on the inter prediction may include the size information.

Alternatively, the top cost may be derived as a value acquired by normalizing the SAD of the top template of the current block and the top template of the reference block for the MVP candidate with the size of the top template and the left cost may be derived as a value acquired by normalizing the SAD of the left template of the current block and the left template of the reference block for the MVP candidate with the size of the left template. The left cost and the top cost may be derived based on Equation 5 described above.

Further, as another example, the cost of the MVP candidate may be derived as the sum of the top cost of the MVP candidate and the left cost of the MVP candidate, the top cost of the MVP candidate may be derived based on a top luma cost of the MVP candidate and a top chroma cost of the MVP candidate, and the left cost of the MVP candidate may be derived as the left luma cost of the MVP candidate and the left chroma cost of the MVP candidate.

The top luma cost of the MVP candidate may be derived as a sum of absolute difference (SAD) of the top template of the luma block of the current block and the top template of the chroma block of the reference block for the MVP candidate and the top chroma cost of the MVP candidate may be derived as an SAD of the top template of the chroma block of the current block and the top template of the chroma block of the reference block for the MVP candidate. Specifically, the top cost of the MVP candidate may be derived based on the following equation.

$$\text{cost}A(LX) = (w^* \text{cost}A(LX,L) >> \log 2(W_L \times 2)) + ((1-w) \\ ^* \text{cost}A(LX,C) >> \log 2(W_C)) \quad \text{[Equation 12]}$$

Here, costA(LX) may represent the top cost of the MVP candidate, costA(LX, L) may represent the top cost of the luma block of the current block, costA(LX, C) may represent the top cost of the chroma block of the current block, $W_L$ may represent the width of the luma block of the current block, $W_C$ may represent the width of the chroma block of the current block, and w may represent the weighting factor. Meanwhile, for example, the weighting factor may be set to the value which is 0.5 or more and 1 or less.

Further, the left luma cost of the MVP candidate may be derived as a sum of absolute difference (SAD) of the left template of the luma block of the current block and the left template of the chroma block of the reference block for the MVP candidate and the left chroma cost of the MVP candidate may be derived as an SAD of the left template of the chroma block of the current block and the left template of the chroma block of the reference block for the MVP candidate. Specifically, the left cost of the MVP candidate may be derived based on the following equation.

$$\text{cost}L(LX) = (w^* \text{cost}L(LX,L) >> \log 2(2 \times H_L)) + ((1-w) \\ ^* \text{cost}L(LX,C) >> \log 2(H_C)) \quad \text{[Equation 13]}$$

Here, costL(LX) may represent the left cost of the MVP candidate, costL(LX, L) may represent the left cost of the luma block of the current block, costL(LX, C) may represent the left cost of the chroma block of the current block, $H_L$ may represent the height of the luma block of the current block, $H_C$ may represent the height of the chroma block of the current block, and w may represent the weighting factor. Meanwhile, for example, the weighting factor may be set to the value which is 0.5 or more and 1 or less.

Further, the information on the inter prediction may include the LIC flag and the cost of the MVP candidate may include the luma cost and the chroma cost. When the value of the LIC flag is 1, the luma cost may be derived as IC_SAD. When the value of the LIC flag is 0, the luma cost may be derived based on Equation 1 described above.

Here, the IC_SAD may be derived based on the following equation.

$$IC\_SAD => \Sigma|Cur-Ref-iDelta|$$

$$iDelta=(\Sigma|Cur|-\Sigma|Ref|)/W\times H \quad \text{[Equation 14]}$$

Here, Cur may represent a reconstruction sample included in the template of the luma block of the current block, Ref may represent the reconstruction sample included in the template of the luma block of the reference block for the MVP candidate, W may represent the width of the luma block of the current block, and H may represent the height of the luma block of the current block. Meanwhile, the chroma cost may be derived as the IC_SAD. Alternatively, the chroma cost may be derived as a different value from the luma cost. The chroma cost may be derived based on Equation 1 described above.

The decoding apparatus derives a modified MVP candidate list based on the costs for the MVP candidates (S1530).

For example, the decoding apparatus may derive a reordered MVP candidate list by reordering the MVP candidates in the order of small cost, derive a refine MVP candidate based on a specific MVP candidate among the MVP candidates, and derive the modified MVP candidate list by adding the refine MVP candidate to the reordered MVP candidate list.

Alternatively, the decoding apparatus may derive the modified MVP candidate list by reordering the MVP candidates in the order of small cost. Alternatively, the decoding apparatus may derive the refine MVP candidate based on a specific MVP candidate among the MVP candidates of the MVP candidate list and derive the modified MVP candidate list by adding the refine MVP candidate to the MVP candidate list.

Meanwhile, the cost for the MVP candidate may include a luma cost and a chroma cost and the luma cost and the chroma cost may be derived as different values. In this case, the modified MVP candidate list for the luma block of the current block may be derived based on the luma cost and the modified MVP candidate list for the chroma block of the current block may be derived based on the chroma cost.

Specifically, the decoding apparatus may derive the reordered MVP candidate list by reordering the MVP candidates included in the MVP candidate list for the luma block of the current block in the order of small luma cost, derive the refine MVP candidate based on a specific MVP candidate among the MVP candidates, and derive the modified MVP candidate list for the luma block by adding the refine MVP candidate to the reordered MVP candidate list. Further, the decoding apparatus may derive the reordered MVP candidate list by reordering the MVP candidates included in the MVP candidate list for the chroma block of the current block in the order of small chroma cost, derive the refine MVP candidate based on a specific MVP candidate among the MVP candidates, and derive the modified MVP candidate list for the chroma block by adding the refine MVP candidate to the reordered MVP candidate list.

Meanwhile, the MVP candidates may be derived as the specific MVP candidate in the reordering order. Alternatively, a MVP candidate having a smallest cost among the MVP candidates may be derived as the specific MVP candidate.

Specifically, the refine MVP candidate may be derived as follows.

As an example, the decoding apparatus may derive a template having a smallest cost with the template of the current block among the templates of the reference blocks in a search range and derive a motion vector indicating the reference block of the derived template as the refine MVP candidate. Here, the search range may be 1 integer pel range around a position indicated b y the specific MVP candidate. Alternatively, the search range may be 2 integer pel range around the position indicated by the specific MVP candidate. Alternatively, the search range may be half integer pel range around the position indicated by the specific MVP candidate. Further, the search range may be set to a range other than the examples.

The decoding apparatus may derive the modified MVP candidate list by adding the refine MVP candidate to the reordered MVP candidate list. For example, the refine MVP candidate may be added to the modified MVP candidate list in an order that precedes the specific MVP candidate. Meanwhile, when the refine MVP candidate is added to the modified MVP candidate list, the MVP candidates of the modified MVP candidate list may be reordered. For example, when the refine MVP candidate is a first-order MVP candidate of the modified MVP candidate list, MVP candidates other than the refine MVP candidate may be reordered in the order of the MVP candidate list.

Meanwhile, the decoding apparatus may determine that the MVP candidate of the modified MVP candidate list represents the same motion vector as an MVP candidate in the previous order. When the MVP candidate represents the same motion vector as the MVP candidate in the previous order, the MVP candidate may be removed from the modified MVP candidate list. The decoding apparatus may determine whether all MVP candidates of the modified MVP candidate list represent the same motion vector as the MVP candidate in the previous order. Alternatively, the decoding apparatus may determine that the refine MVP candidate represents the same motion vector as the MVP candidate in the previous order. Alternatively, the decoding apparatus may determine that the reordered MVP candidate represents the same motion vector as the MVP candidate in the previous order. Here, the reordered MVP candidate may be an MVP candidate in which the order in the MVP candidate list and the order in the reordered MVP candidate list are different.

The decoding apparatus derives the MVP of the current block based on the modified MVP candidate list (S1540). The decoding apparatus may select one MVP candidate of the MVP candidates of the modified MVP candidate list and derive the motion vector represented by the selected MVP candidate as the MVP of the current block. Specifically, for example, the decoding apparatus may acquire an MVP index indicating one MVP candidate among the MVP candidates included in the modified MVP candidate list through bitstream. The information on the inter prediction may include the MVP index. The decoding apparatus may derive the motion vector of the MVP candidate indicated by the MVP index among the MVP candidates of the modified MVP candidate list as the MVP of the current block.

The decoding apparatus derives the motion vector of the current block based on the MVP and the motion vector difference (MVD) of the current block (S1550). The decoding apparatus may acquire the MVD of the current block through the bitstream. The information on the inter prediction may include the MVD. The decoding apparatus may derive the motion vector of the current block through addition of the MVP and the MVD.

The decoding apparatus performs a prediction of the current block based on the reference picture index and the motion vector of the current block (S1560). The prediction block of the current block may be derived based on the reference picture index and the motion vector of the current block and the reconstruction block may be derived based on the prediction block. Specifically, the decoding apparatus may derive the reference block in the reference picture based on the reference picture index and the motion vector of the current block. The decoding apparatus may derive a specific reference picture included in a specific reference picture list indicated by the reference picture index as the reference picture of the current block and derive a block indicated by the motion vector in the reference picture as the reference block of the current block. The decoding apparatus may generate the prediction sample based on the reference block, and directly use the prediction sample as the reconstruction sample according to the prediction mode or generate the reconstruction sample by adding the residual sample to the prediction sample. When there is the residual sample for the current block, the decoding apparatus may acquire information on residual for the current block from the bitstream. The information on the residual may include transform coefficients relating to the residual samples. The decoding apparatus may derive the residual sample (or residual sample array) for the current block based on the residual information. The decoding apparatus may generate the reconstructed sample based on the prediction sample and the residual sample and derive the reconstructed block or reconstructed picture based on the reconstructed sample. Thereafter, the decoding apparatus may apply an in-loop filtering procedure such as a deblocking filtering and/or SAO procedure to the reconstructed picture in order to enhance subjective/objective picture quality as necessary.

Figure 16:
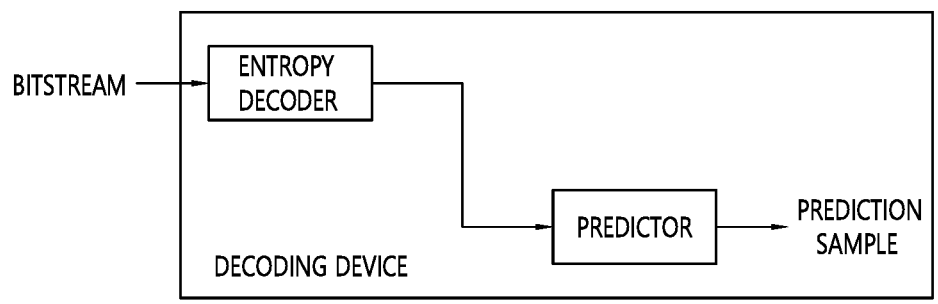
FIG. 16 schematically illustrates a decoding apparatus performing a video decoding method according to the present disclosure.

FIG. 16 schematically illustrates a decoding apparatus performing a video decoding method according to the present disclosure. The method disclosed in FIG. 15 may be performed by the decoding apparatus disclosed in FIG. 16. Specifically, for example, the entropy decoder of the decoding apparatus of FIG. 16 may perform S1500 of FIG. 15 and the predictor of the decoding apparatus of FIG. 16 may perform S1510 to S1560 of FIG. 15.

According to the present disclosure, an MVP candidate list including various MVP candidates can be derived based on neighboring blocks and through the derived MVP candidate list, prediction accuracy can be enhanced, a bit amount for transmission of an MVD can be reduced, and overall coding efficiency can be enhanced.

Further, according to the present disclosure, an optimum MVP candidate for a current block can be rearranged in an order indicated by an MVP index having a small value by considering cost and through the rearranged optimum MVP candidate, a bit amount for a prediction can be reduced and overall coding efficiency can be enhanced.

In addition, according to the present disclosure, cost considering a luma component and a chroma component of the current block can be derived and the optimum MVP candidate list for the current block can be constructed based on the cost, and as a result, prediction accuracy and efficiency of the luma component and the chroma component can be enhanced and the overall coding efficiency can be enhanced.

Further, according to the present disclosure, a refine MVP candidate which is the optimum MVP candidate can be derived based on the MVP candidate of the current block, and as a result, the prediction accuracy and efficiency can be enhanced and the overall coding efficiency can be enhanced.

In the aforementioned embodiment, methods have been described based on flowcharts as a series of steps or blocks, but the methods are not limited to the order of the steps of the present disclosure and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present disclosure and may be deleted.

The method according to the present disclosure described above may be implemented as a software form and the encoding apparatus and/or the decoding apparatus according to the present disclosure may be included in an apparatus for performing image processing, such as a TV, a computer, a smartphone, a set-top box, a display device, etc., for example.

In the present disclosure, when the embodiments are implemented by software, the aforementioned method may be implemented by a module (a process, a function, and the like) that performs the aforementioned function. The module may be stored in the memory and executed by the processor. The memory may be positioned inside or outside the processor and connected with the processor by various well-known means. The processor may include an application-specific integrated circuit (ASIC), another chipset, a logic circuit and/or a data processing apparatus. The memory may include a read-only memory (ROM), a random access memory (RAM), a flash memory, a memory card, a storage medium, and/or other storage devices. In other words, the embodiments described in the present disclosure may be implemented and performed on a processor, a microprocessor, a controller, or a chip. For example, functional units illustrated in each drawing may be implemented and performed on a computer, the processor, the microprocessor, the controller, or the chip.

In addition, the decoding apparatus and the encoding apparatus to which the present disclosure is applied may be included in a multimedia broadcasting transmitting and receiving device, a mobile communication terminal, a home cinema video device, a digital cinema video device, a surveillance camera, a video chat device, a real time communication device such as video communication, a mobile streaming device, storage media, a camcorder, a video on demand (VoD) service providing device, an over the top (OTT) video device, an Internet streaming service providing device, a 3 dimensional (3D) video device, a video telephone device, and a medical video device, etc., and may be used to process a video signal or a data signal. For example, the Over the top (OTT) video device may include a game console, a Blu-ray player, an Internet access TV, a home theater system, a smartphone, a tablet PC, a digital video recorder (DVR), and the like.

In addition, a processing method to which the present disclosure is applied may be produced in the form of a program executed by the computer, and may be stored in a computer-readable recording medium. Multimedia data having a data structure according to the present disclosure may also be stored in the computer-readable recording medium. The computer-readable recording medium includes all types of storage devices and distribution storage devices storing computer-readable data. The computer-readable recording medium may include, for example, a Blu-ray disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media implemented in the form of a carrier wave (e.g., transmission over the Internet). Further, the bitstream generated by the encoding method may be stored in the computer-readable recording medium or transmitted through a wired/wireless communication network. In addition, the embodiment of the present disclosure may be implemented as a computer program product by a program code, which may be performed on the computer by the embodiment of the present disclosure. The program code may be stored on a computer-readable carrier.

Also, a content streaming system to which the present disclosure is applied may include an encoding server, a streaming server, a web server, a media storage, a user device, and a multimedia input device.

The encoding server compresses content input from multimedia input devices, such as smartphones, cameras, camcorders, and so on, into digital data to generate a bitstream and transmit the bitstream to the streaming server. As another example, when multimedia input devices, such as smartphones, cameras, camcorders, and so on, directly generate bitstream, the encoding server may be omitted. The bitstream may be generated by an encoding method or a bitstream generating method to which the present disclosure is applied, and the streaming server may temporarily store the bitstream in the process of transmitting or receiving the bitstream.

The streaming server transmits multimedia data to the user device based on a user request through the web server, and the web server serves as an intermediary for informing the user of what services are provided. When a user requests a desired service from the web server, the web server delivers it to a streaming server, and the streaming server transmits multimedia data to the user. Here, the content streaming system may include a separate control server, and, in this case, the control server controls a command/response between devices in the content streaming system.

The streaming server may receive content from a media repository and/or an encoding server. For example, when content is received from the encoding server, the content may be received in real time. In this case, in order to provide a smooth streaming service, the streaming server may store the bitstream for a predetermined time.

Examples of the user device include a mobile phone, a smartphone, a laptop computer, a digital broadcasting terminal, a personal digital assistant (PDA), a portable multimedia player (PMP), a navigation device, and a slate PC, a tablet PC, ultrabook, a wearable device (e.g., smartwatch, glass glasses, head mounted display), a digital TV, a desktop computer, a digital signage, and so on. Each server in the content streaming system may operate as a distributed server, and in this case, data received from each server may be processed in a distributed manner.

What is claimed is:

1. A video decoding method performed by a decoding apparatus, comprising:
   obtaining information for inter prediction of a current block from a bitstream;
   constructing a motion vector predictor (MVP) candidate list based on a neighboring block of the current block;
   deriving costs of MVP candidates included in the MVP candidate list;
   deriving a modified MVP candidate list based on the costs of the MVP candidates;
   deriving a MVP of the current block based on the modified MVP candidate list;
   deriving a motion vector of the current block based on the MVP of the current block and a motion vector difference (MVD); and
   performing prediction of the current block based on the motion vector and a reference picture index of the current block,
   wherein the information for the inter prediction includes the MVD and the reference picture index,
   wherein the cost of the MVP candidate is derived as the sum of a top cost of the MVP candidate and a left cost of the MVP candidate,
   the top cost of the MVP candidate is derived based on a top luma cost of the MVP candidate, a top chroma cost of the MVP candidate, a width of a luma block of the current block, a width of a chroma block of the current block and a weighting factor,
   the left cost of the MVP candidate is derived based on a left luma cost of the MVP candidate, a left chroma cost of the MVP candidate, a height of the luma block of the current block, a height of the chroma block of the current block and the weighting factor.

2. The video decoding method of claim 1, wherein the neighboring block includes a left neighboring block of the current block, a top neighboring block of the current block, a top-right neighboring block of the current block, a bottom-left neighboring block of the current block, and a top-left neighboring block of the current block.

3. The video decoding method of claim 2, wherein the constructing of the MVP candidate list based on the neighboring block of the current block includes
   determining availabilities in the order of the motion vector of the left neighboring block of the current block, the motion vector of the top neighboring block, the motion vector of the top-right neighboring block, the motion vector of the bottom-left neighboring block, and the motion vector of the top-left neighboring block, and
   sequentially adding available motion vectors to the MVP candidate list as the MVP candidate.

4. The video decoding method of claim 3, wherein the reference picture index indicates a specific reference picture included in a specific reference picture list,
   it is sequentially determined whether the motion vector of the neighboring block corresponds to a first motion vector and a second motion vector, and
   when the motion vector of the neighboring block is not the first motion vector and the second motion vector, it is determined that the motion vector of the neighboring block is not available, and
   wherein the first motion vector is the motion vector for the specific reference picture included in the specific reference picture list, and
   the second motion vector is the motion vector for the specific reference picture included in a reference picture list other than the specific reference picture list.

5. The video decoding method of claim 2, wherein the maximum number of MVP candidates included in the MVP candidate list is 5.

6. The video decoding method of claim 1, wherein the top luma cost of the MVP candidate is derived as a sum of absolute difference (SAD) of a top template of the luma block of the current block and thea top template of a luma block of a reference block for the MVP candidate, and the top chroma cost of the MVP candidate is derived as the SAD of a top template of the chroma block of the current block and a top template of a chroma block of the reference block for the MVP candidate.

7. The video decoding method of claim 6, wherein the top cost of the MVP candidate is derived based on the following equation, $$\text{costA}(LX) = (w * \text{costA}(LX,L) >> \log 2(W_L \times 2)) + ((1-w) * \text{costA}(LX,C) >> \log 2(W_C))$$

here, costA(LX) represents the top cost of the MVP candidate, costA(LX, L) represents the top cost of the luma block of the current block, costA(LX, C) represents the top cost of the chroma block of the current block, $W_L$ represents the width of the luma block of the current block, $W_C$ represents the width of the chroma block of the current block, and w represents the weighting factor.

8. The video decoding method of claim 1, wherein the left luma cost of the MVP candidate is derived as a sum of absolute difference (SAD) of a left template of the luma block of the current block and a left template of a luma block of a reference block for the MVP candidate, and the left chroma cost of the MVP candidate is derived as the SAD of a left template of the chroma block of the current block and a left template of a chroma block of the reference block for the MVP candidate.

9. The video decoding method of claim 8, wherein the left cost of the MVP candidate is derived based on the following equation, $$\text{costL}(LX) = (w * \text{costL}(LX,L) >> \log 2(2 \times H_L)) + ((1-w) * \text{costL}(LX,C) >> \log 2(H_C))$$

here, costL(LX) represents the left cost of the MVP candidate, costL(LX, L) represents the left cost of the luma block of the current block, costL(LX, C) represents the left cost of the chroma block of the current block, $H_L$ represents the height of the luma block of the current block, $H_C$ represents the height of the chroma block of the current block, and w represents the weighting factor.

10. The video decoding method of claim 1, wherein the deriving of the modified MVP candidate list based on the costs for the MVP candidates includes
deriving a reordered MVP candidate list by reordering the MVP candidates in the order of small cost,
deriving a refine MVP candidate based on a specific MVP candidate among the MVP candidates, and
deriving the modified MVP candidate list by adding the refine MVP candidate to the reordered MVP candidate list.

11. A decoding apparatus for performing video decoding, comprising:
an entropy decoder to obtain information for inter prediction of a current block from a bitstream; and
a predictor to construct a motion vector predictor (MVP) candidate list based on a neighboring block of the current block, derive costs of MVP candidates included in the MVP candidate list, derive a modified MVP candidate list based on the costs of the MVP candidates, derive an MVP of the current block based on the modified MVP candidate list, derive a motion vector of the current block based on the MVP of the current block and a motion vector difference (MVD), and perform prediction of the current block based on a reference picture index and the motion vector of the current block,
wherein the information for the inter prediction includes the reference picture index and the MVD,
wherein the cost of the MVP candidate is derived as the sum of a top cost of the MVP candidate and a left cost of the MVP candidate,
the top cost of the MVP candidate is derived based on a top luma cost of the MVP candidate, a top chroma cost of the MVP candidate, a width of a luma block of the current block, a width of a chroma block of the current block and a weighting factor,
the left cost of the MVP candidate is derived based on a left luma cost of the MVP candidate, a left chroma cost of the MVP candidate, a height of the luma block of the current block, a height of the chroma block of the current block and the weighting factor.

12. An encoding apparatus for performing video encoding, comprising:
a predictor to construct a motion vector predictor (MVP) candidate list based on a neighboring block of a current block, derive costs of MVP candidates included in the MVP candidate list, derive a modified MVP candidate list based on the costs of the MVP candidates, derive an MVP of the current block based on the modified MVP candidate list, derive a motion vector of the current block based on the MVP of the current block, and perform prediction of the current block based on the motion vector of the current block; and
an entropy encoder to encode information for inter prediction of the current block,
wherein the information for the inter prediction includes a reference picture index indicating a reference picture of the current block and a motion vector difference (MVD),
wherein the cost of the MVP candidate is derived as the sum of a top cost of the MVP candidate and a left cost of the MVP candidate,
the top cost of the MVP candidate is derived based on a top luma cost of the MVP candidate, a top chroma cost of the MVP candidate, a width of a luma block of the current block, a width of a chroma block of the current block and a weighting factor,
the left cost of the MVP candidate is derived based on a left luma cost of the MVP candidate, a left chroma cost of the MVP candidate, a height of the luma block of the current block, a height of the chroma block of the current block and the weighting factor.

* * * * *